United States Patent
Setaki et al.

(10) Patent No.: US 10,458,160 B2
(45) Date of Patent: Oct. 29, 2019

(54) SMALL-SIZED CONSTRUCTION MACHINE

(71) Applicant: Hitachi Construction Machinery Tierra Co., Ltd., Koka-shi, Shiga (JP)

(72) Inventors: Masashi Setaki, Kameoka (JP); Tomoyuki Tanaka, Yasu (JP); Junya Kawamoto, Moriyama (JP)

(73) Assignee: Hitachi Construction Machinery Tierra Co., Ltd, Koka-shi (JP)

( * ) Notice: Subject to any disclaimer, the term of this patent is extended or adjusted under 35 U.S.C. 154(b) by 81 days.

(21) Appl. No.: 15/757,504

(22) PCT Filed: Sep. 7, 2016

(86) PCT No.: PCT/JP2016/076313
§ 371 (c)(1),
(2) Date: Mar. 5, 2018

(87) PCT Pub. No.: WO2017/110158
PCT Pub. Date: Jun. 29, 2017

(65) Prior Publication Data
US 2018/0245381 A1     Aug. 30, 2018

(30) Foreign Application Priority Data

Dec. 26, 2015  (JP) .................................. 2015-255487

(51) Int. Cl.
*B62D 25/00* (2006.01)
*E05B 83/34* (2014.01)
(Continued)

(52) U.S. Cl.
CPC .............. *E05B 83/34* (2013.01); *B60K 15/05* (2013.01); *B60K 15/063* (2013.01);
(Continued)

(58) Field of Classification Search
CPC ......... E05B 83/34; E05B 83/42; B60K 15/05; B60K 15/063; B60K 15/067;
(Continued)

(56) References Cited

U.S. PATENT DOCUMENTS 4,746,089 A * 5/1988 Clapper ................. B60K 15/05
220/230
5,580,019 A * 12/1996 Glesser .............. B60K 15/0406
224/400

FOREIGN PATENT DOCUMENTS

JP    2003-211983 A    7/2003
JP    2004-299414 A    10/2004
(Continued)

OTHER PUBLICATIONS

International Search Report (PCT/ISA/210) issued in PCT Application No. PCT/JP2016/076313 dated Nov. 15, 2016 with English-language translation (two (2) pages).
(Continued)

*Primary Examiner* — Lori L Lyjak
(74) *Attorney, Agent, or Firm* — Crowell & Moring LLP

(57) ABSTRACT

A cap holder (21) that is attached to the inner surface side of a fuel filling door (19) in a state of facing an inner surface of the fuel filling door (19) with an interval in order to hold a cap (11K) removed from a fuel tank (11) and a lock (22) that locks the fuel filling door (19) from the outside in a state where the fuel filling door (19) closes a fuel filling opening (18) are provided on the fuel filling door (19). The lock (22) has a lock lever (22C) that rotationally moves between a locking position where the fuel filing door (19) maintains a state of closing the fuel filling opening (18) and an unlocking position where the fuel filling door (19) allows opening of the fuel filling opening (18). This lock lever (22C) is configured by a long member a base end of which is rotatably attached to the fuel filling door (19) and a leading
(Continued)

end of which is allowed to enter a gap between the fuel filling door (19) and the cap holder (21).

6 Claims, 21 Drawing Sheets

(51) Int. Cl.
    *B60K 15/05*     (2006.01)
    *E02F 9/24*     (2006.01)
    *B60K 15/063*     (2006.01)
    *B60K 15/067*     (2006.01)
    *E02F 3/32*     (2006.01)
    *E02F 9/08*     (2006.01)
    *E05B 83/42*     (2014.01)

(52) U.S. Cl.
    CPC .............. *B60K 15/067* (2013.01); *E02F 3/325* (2013.01); *E02F 9/0883* (2013.01); *E02F 9/0891* (2013.01); *E02F 9/24* (2013.01); *B60K 2015/053* (2013.01); *B60K 2015/0561* (2013.01); *B60K 2015/0592* (2013.01); *B60Y 2200/412* (2013.01); *E05B 83/42* (2013.01)

(58) Field of Classification Search
    CPC ...... B60K 2015/053; B60K 2015/0561; B60K 2015/0592; E02F 3/325; E02F 9/0883; E02F 9/0891; E02F 9/24; B60Y 2200/412
    See application file for complete search history.

(56) References Cited

FOREIGN PATENT DOCUMENTS

| | | | |
|---|---|---|---|
| JP | 2005-104284 A | | 4/2005 |
| JP | 2009061826 A | * | 3/2009 |
| WO | WO-9104885 A1 | * | 4/1991 ............. B60K 15/05 |

OTHER PUBLICATIONS

Japanese-language Written Opinion (PCT/ISA/237) issued in PCT Application No. PCT/JP2016/076313 dated Nov. 15, 2016 (three (3) pages).

* cited by examiner

SMALL-SIZED CONSTRUCTION MACHINE

TECHNICAL FIELD

The present invention relates to a construction machine such as, for example, a hydraulic excavator and the like and, in particular, relates to a small-sized construction machine that prevents omission of closing a cap of a fuel tank.

BACKGROUND ART

In general, a small-sized hydraulic excavator used for a disassembling work inside a building, an excavating work in a narrow space such as a narrow street and thus, is known as a hydraulic excavator that is a typical example of the construction machine. This small-sized hydraulic excavator is generally called a compact excavator and is configured by a self-propelled lower traveling structure, an upper revolving structure that is rotatably mounted on the lower traveling stricture and a working mechanism that is provided on the front-part side of the upper revolving structure. Since the small-sized hydraulic excavator has a small upper revolving structure and is narrow in space for installation of onboard devices on a revolving frame, a counterweight, an engine, a cab, a fuel tank and the like are mounted on this revolving frame in a state close to each other.

Here, the fuel tank is known as configured to equip a fuel filling port into which a fuel supplying nozzle is inserted when filing fuel and a cap for closing the fuel filling port (see, for example, Patent Documents 1, 2). Here, the fuel filling port of the fuel tank is surrounded by a fuel filling opening that is located on an outer surface of the cab and the fuel filling opening is lidded by a fuel filling door.

PRIOR ART DOCUMENT

Patent Document

Patent Document 1: Japanese Patent Laid-Open No. 2003-211983 A
Patent Document 2: Japanese Patent Laid-Open No. 2004-299414 A

SUMMARY OF THE INVENTION

Incidentally, since the space on the revolving frame is narrow in the small-sized hydraulic excavator, there is no place to put a cap after removing it when fuel filling is performed on a work site and a possibility to omit closing the cap caused by falling and leaving-behind thereof is high.

Accordingly, a configuration to provide a cap holder on the fuel filling door and holding the removed cap by the cap holder is conceivable. However, in a case of the small-sized hydraulic excavator, since workability when a worker puts a portable tank up and performs fuel filling is taken into consideration, the fuel filling opening that is larger than that of an automobile becomes necessary. Therefore, the fuel filling door can be closed even with the cap being held on the cap holder of the fuel filling door and there is such an issue that closing the fuel filling port by the cap is omitted.

The present invention was made in view of the aforementioned prior-art problems and has an object to provide a small-sized construction machine that prevents omission of closing the cap of the fuel tank.

(1). In order to solve the above-described problems, the present invention is applied to a small-sized construction machine comprising: a self-propelled lower traveling structure; an upper revolving structure that is rotatably mounted on the lower traveling structure; and a working mechanism that is provided on the front part side of the upper revolving structure, wherein the upper revolving structure includes: a revolving frame forming a support structural body, a counterweight provided on a rear side of the revolving frame, an engine located on the front side of the counterweight and mounted on the revolving frame, a cab provided on the revolving frame so as to cover the engine from above and on one side in a left-right direction of which an openable/closable door is provided, and a fuel tank that has a fuel filling port and a cap that closes the fuel filling port and stores fuel to be supplied to the engine, wherein a fuel filling opening that is located on the side behind the door and surrounds the fuel filling port of the fuel tank and a lid member that caps the fuel filling opening to be openable/closable are provided on an outer surface of one side in the left-right direction on which the door of the cab is provided.

Then, a feature of the constitution adopted for the present invention is that a cap holder that is attached to the inner surface side of the lid member in a state of facing an inner surface of the lid member with an interval in order to hold the cap removed from the fuel tank and a lock that locks the lid member from the outside in a state where the lid member closes the fuel filling opening are provided on the lid member, the lock has a lock lever that is composed of a long member a base end of which is rotatably attached to the lid member and a leading end of which is allowed to enter the gap between the lid member and the cap holder and that rotationally moves between a locking position where the lid member maintains a state of closing the fuel filling opening and an unlocking position where the lid member allows opening of the fuel filling opening.

According to this configuration, it is possible to prevent omission of closing the cap of the fuel tank.

BRIEF DESCRIPTION OF THE DRAWINGS

FIG. 5 is a perspective view showing the cab, a fuel filling opening, a fuel filling door, a fuel tank and the like.

MODE FOR CARRYING OUT THE INVENTION

Hereinafter, a small-sized construction machine according to an embodiment of the present invention will be described in detail referring to FIG. 1 to FIG. 22 by giving a small-sized hydraulic excavator as an example. Incidentally, a fuel filling door 19 that will be described later is shown by a virtual line as it is transparent in FIG. 7, FIG. 8, FIGS. 10 to 14, FIGS. 18 to 20, FIG. 22 for the convenience of description.

Figure 1:
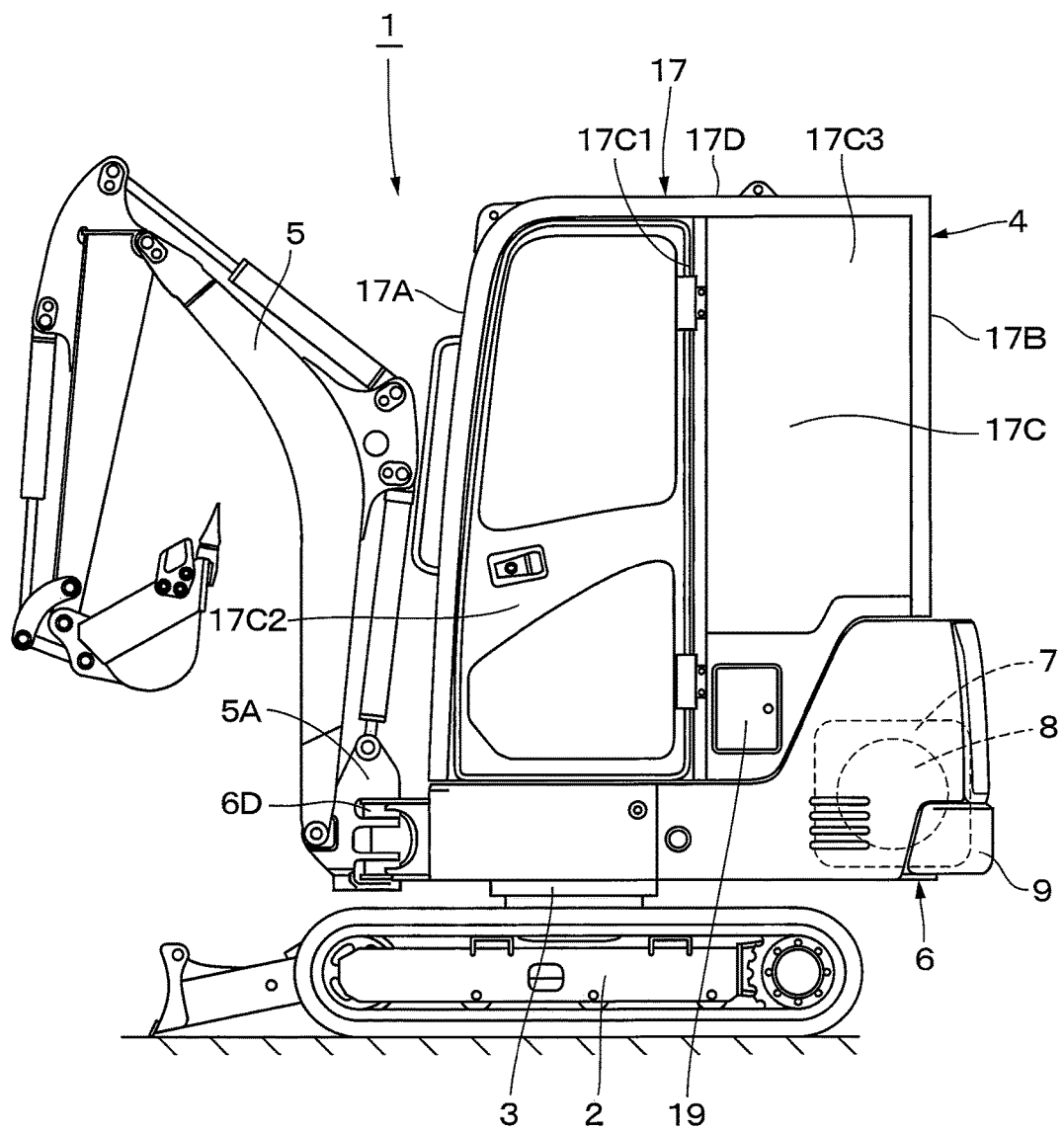
FIG. 1 is a front view showing a small-sized hydraulic excavator according to an embodiment of the present invention.

In FIG. 1, a small-sized hydraulic excavator 1 which is a typical example of the small-sized construction machine includes a self-propelled crawler type lower traveling structure 2 and an upper revolving structure 4 rotatably mounted on the lower traveling structure 2 through a revolving device 3. A swing-type working mechanism 5 capable of swing in a left-right direction is provided on the front-part side of the upper revolving structure 4 and an excavating work of earth and sand or the like is performed by using this working mechanism 5. Here, the small-sized hydraulic excavator 1 is used in a disassembling work inside a building, an excavating work in a narrow space such as a narrow street and thus, a machine weight is kept to approximately 0.8 to 8 tons, for example.

Figure 2:
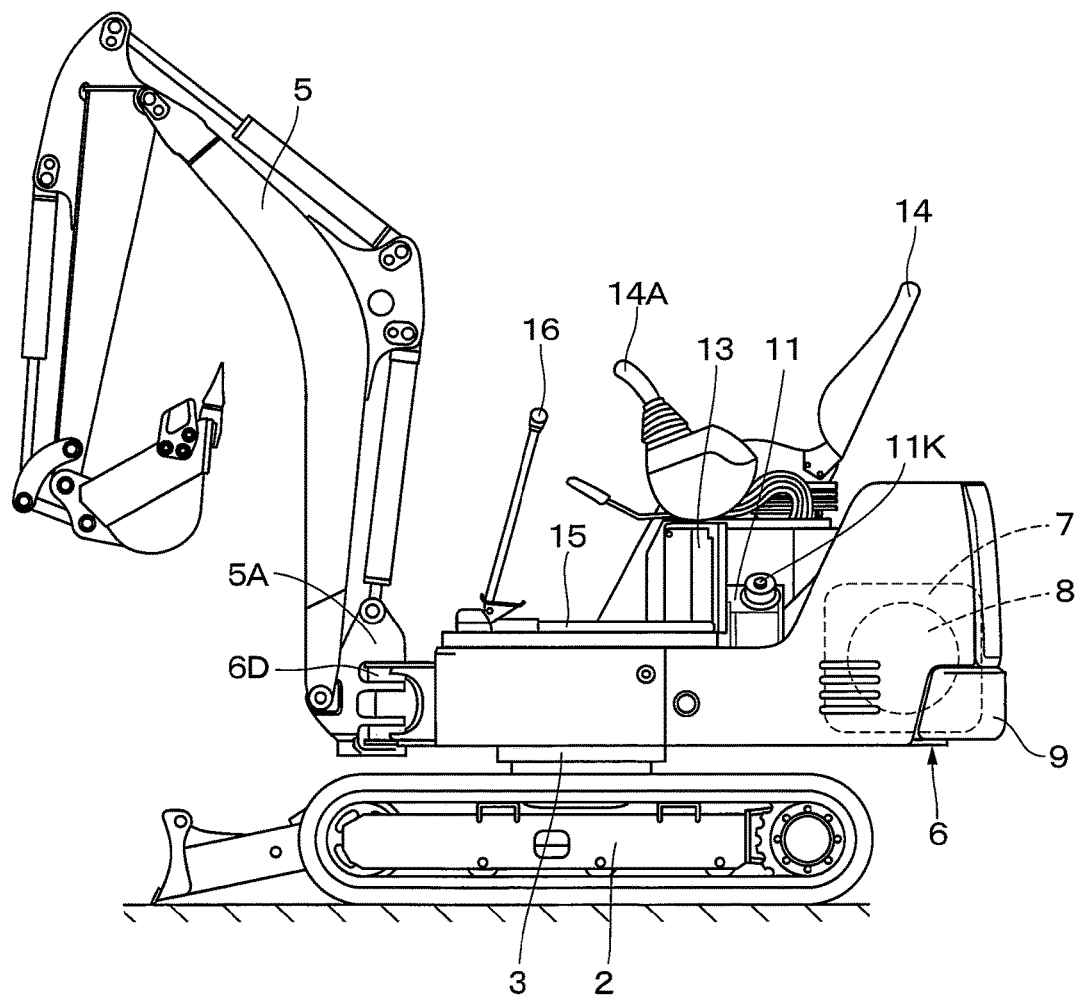
FIG. 2 is a front view showing the hydraulic excavator with a cab being removed.
Figure 3:
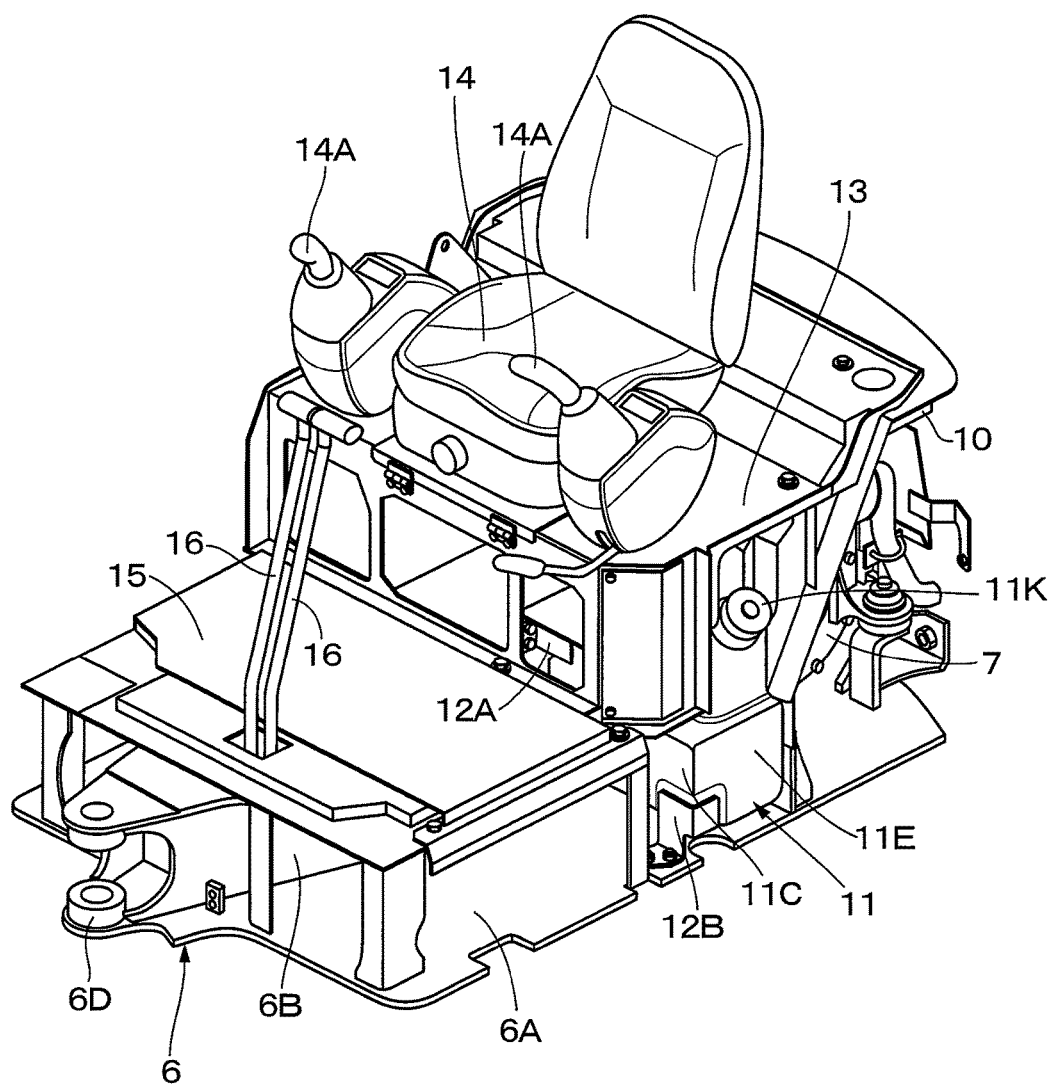
FIG. 3 is a perspective view showing a state where the cab and an exterior cover are removed from an upper revolving structure of the hydraulic excavator.

As shown in FIGS. 1 to 3, the upper revolving structure 4 is constituted by including a revolving frame 6 which will be described later, an engine 7, a counterweight 9, a support member 10, a fuel tank 11, an operator's seat platform 13, an operator's seat 14, and a cab 17. Here, since the small-sized hydraulic excavator 1 is applied to a small work site such as an inside of a building, a street or the like, for example, the upper revolving structure 4 is formed small. Thus, in the hydraulic excavator 1, a space for disposing various onboard devices on the revolving frame 6 is small, and the operator's seat 14 is disposed on an upper side of the fuel tank 11.

Figure 4:
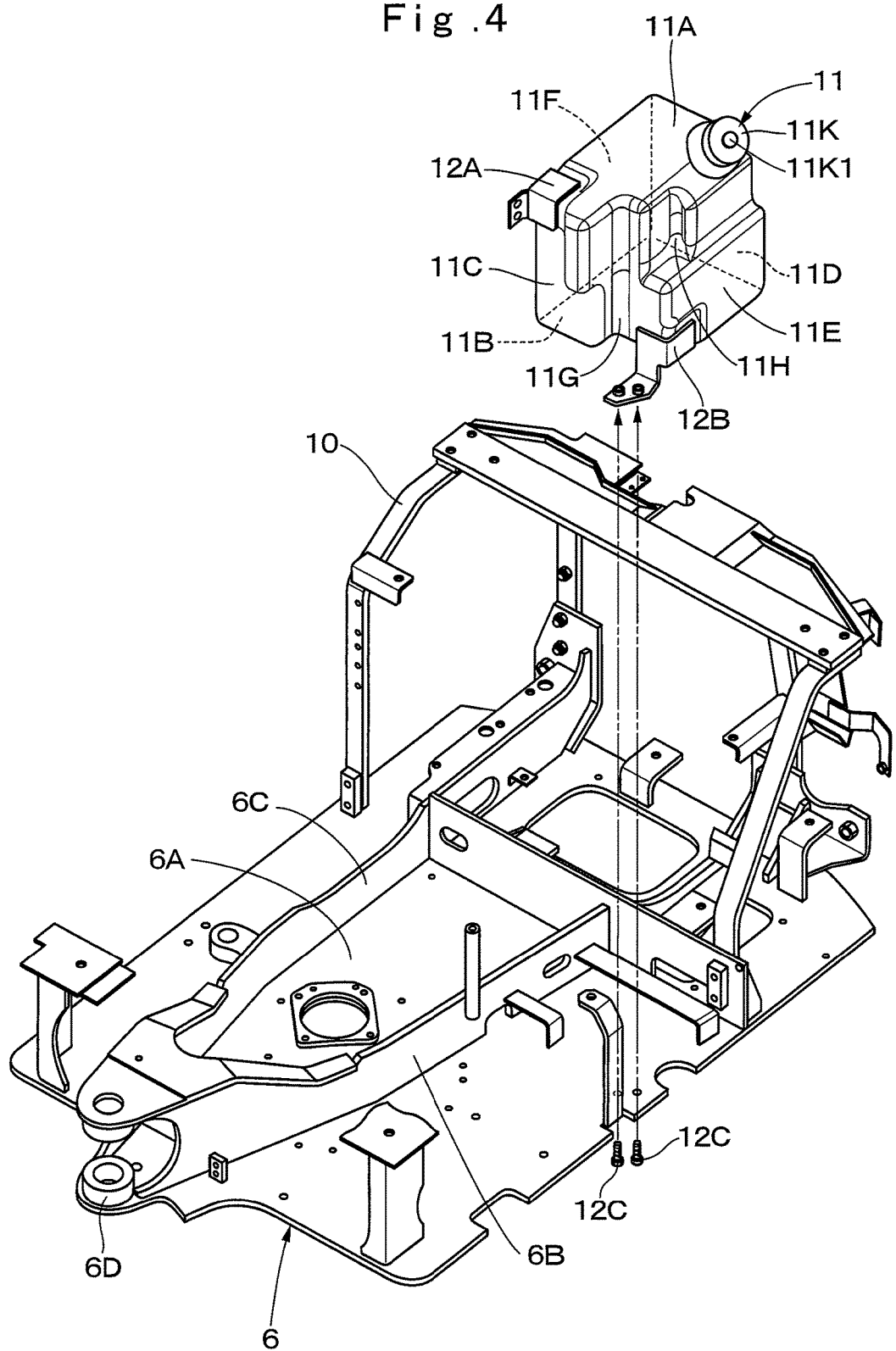
FIG. 4 is an exploded perspective view showing a state of attaching a fuel tank to a revolving frame.

The revolving frame 6 is rotatably provided on the lower traveling structure 2 through the revolving device 3 and configures a base of the upper revolving structure 4. As shown in FIG. 4, the revolving frame 6 is formed of a support structural body by including a bottom plate 6A formed using a thick steel plate or the like and having a rectangular shape extending in a front-and-rear direction and a left vertical plate 6B and a right vertical plate 6C provided upright on the bottom plate 6A so as to extend in the front-and-rear direction. A support bracket 6D is provided on front end portions of the left and right vertical plates 6B and 6C. The support bracket 6D supports a swing post 5A provided on a base end of the working mechanism 5, capable of swing in the left-and-right direction.

The engine 7 as a prime mover is located on the front side of the counterweight 9 which will be described later and mounted on the rear side of the revolving frame 6. The engine 7 is disposed on the revolving frame 6 in a laterally placed state with a crank shaft (not shown) extending in the left-and-right direction. As shown in FIGS. 1 and 2, a hydraulic pump 8 is provided on a left side of the engine 7. The hydraulic pump 8 supplies a pressurized oil toward various hydraulic actuators mounted on the hydraulic excavator 1 by being driven by the engine 7. On the other hand, heat exchangers such as a radiator, an oil cooler and the like (none of them is shown) are disposed on a right side of the engine 7.

The counterweight 9 is provided on a rear side of the revolving frame 6. The counterweight 9 is to take a weight balance with the working mechanism 5 and is formed as an arc-shaped heavy article with a middle part in the left-and-right direction protruding rearward.

The support member 10 is disposed on the left side of the revolving frame 6 and is mounted on the revolving frame 6 so as to be provided across the engine 7. The support member 10 has the operator's seat platform 13 which will be described later mounted and is to support the rear side of the cab 17.

Figure 5:
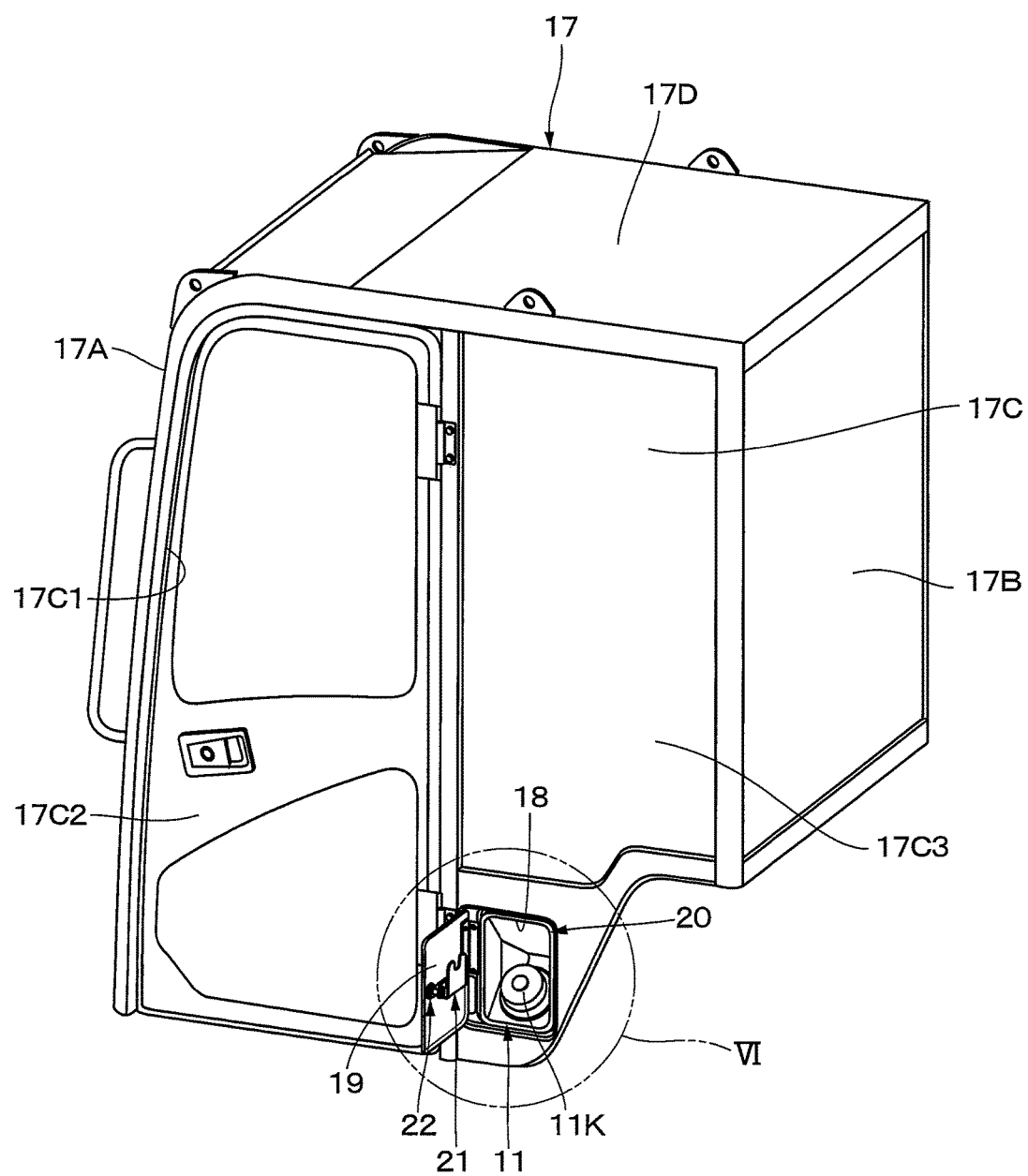

The fuel tank 11 is mounted on the bottom plate 6A by being located closer to the left side than the left vertical plate 6B of the revolving frame 6 and being located on a middle part of the bottom plate 6A in the left-and-right direction. As shown in FIG. 5, the fuel tank 11 is disposed in the cab 17 near the left surface part 17C. In this case, the fuel tank 11 is disposed so as to fit in a space between a left lower surface of the operator's seat platform 13 that will be described later and the bottom plate 6A. The fuel tank 11 is to store the fuel to be supplied to the engine 7. Here, as shown in FIG. 4 and the like, the fuel tank 11 is formed as a box-shaped body surrounded by an top surface 11A, a bottom surface 11B, a front surface 11C, a rear surface 11D, a left surface 11E, and a right surface 11F. A front surface recessed part 11G is formed at a corner part where the front surface 11C and the left surface 11E cross each other and is dented toward the rear surface 11D side over the entire region in the up-and-down direction. Moreover, a side surface recessed part 11H dented to the right surface 11F side is formed at a corner part where an upper-side portion of the left surface 11E and the front surface recessed part 11G cross each other. As described above, the fuel tank 11 is not an even cuboid body but is formed having a complicated three-dimensional shape having the front surface recessed part 11G, the side surface recessed part 11H and the like such as to ensure as large capacity as possible while avoiding interference with various onboard devices mounted on the revolving frame 6.

A cylindrical fuel filling port 11J is provided on an outer surface of a corner part where the top surface 11A, the rear surface 11D, and the left surface 11E of the fuel tank 11 cross each other. The fuel filling port 11J is a port into which a fuel supply nozzle (not shown) is inserted when the fuel is supplied to the fuel tank 11. The fuel filling port 11J protrudes upward diagonally left from the outer surface of the fuel tank 11 and a protruding end of the fuel filling port 11J is disposed in a fuel filling opening 18 which will be described later of the cab 17 (see FIG. 9 and FIG. 15). In other words, the fuel filling port 11J is provided on the rear side of a door 17C2 of the cab 17, facing the fuel filling opening 18. The fuel filling port 11J is closed with a cap 11K.

Here, the top surface 11A side of the fuel tank 11 is fixed to the operator's seat platform 13 by using a mounting bracket 12A and bolts (not shown) and the bottom surface 11B side of the fuel tank 11 is fixed to the bottom plate 6A by using a mounting bracket 12B and bolts 12C. Thereby, as shown in FIG. 4, the fuel tank 11 is located on the left side of the left vertical plate 6B of the revolving frame 6 and on middle part of the bottom plate 6A in a front-rear-direction and is attached onto the bottom plate 6A. The fuel tank 11 brought closer to the left surface part 17C side of the cab 17 that will be described later and is disposed between the revolving frame 6 and the operator's seat platform 13.

The operator's seat platform 13 is provided on the revolving frame 6 through the support member 10 in a state where the upper side of the fuel tank 11 is covered. This operator's seat platform 13 is formed into a substantially cubic shape and is adapted to mount the operator's seat 14 that will be described later.

As shown in FIGS. 2 and 3, the operator's seat 14 is mounted on the operator's seat platform 13 mounted on the revolving frame 6. The operator's seat 14 is for the operator who operates the small-sized hydraulic excavator 1 to be seated, and an operation device 14A for operating the revolving device 3, the working mechanism 5 and the like is disposed on both left and right sides of the operator's seat 14.

On the other hand, a floor member 15 is provided on a front side of the operator's seat platform 13. The floor member 15 is for forming a footing for the operator who gets onboard the small-sized hydraulic excavator 1. A space for accommodating the onboard devices (not shown) such as a control valve or the like is formed between the bottom plate 6A of the revolving frame 6 and the floor member 20. Moreover, two left and right traveling lever pedals 21 to control a traveling operation of the lower traveling structure 2 are provided on the front side of the floor member 20.

The cab 17 is formed as a box body surrounding a periphery of the operator's seat 18 and defines the operator's chamber. As shown in FIG. 5, the cab 17 is formed into formed having a box shape surrounded by a front surface part 17A, a rear surface part 17B that faces the front surface part 17A in the front-rear direction, the left surface part 17C and a right surface part (not shown) that faced in the left-right direction sandwiching the front surface part 17A and the rear surface part 17B and a top surface part 17D closes top ends of the front surface part 17A, the rear surface part 17B, the left surface part 17C and the right surface part.

The left surface part 17C of the cab 17 is constituted by an entrance way 17C1, a door 17C2 with window for opening/closing the entrance way 17C1, and a left rear window 17C3 located on a rear side of the door 17C2. It is constituted such that the operator gets on/off the cab 17 through the entrance way 17C1 by opening the door 17C2.

The cab 17 is mounted onto the revolving frame 6 by its rear side supported by the support member 10 and its front side supported by a support plate on the revolving frame 6. Thereby, the operator's seat 14, the operation device 14A, the traveling levers/pedals 16 and the like are accommodated in the cab 17 and the fuel tank 11 is disposed by bringing closer to the left surface part 17C side of the cab 17. In addition, an upper part of the engine 7 is covered with the cab 17 (see FIG. 1).

The fuel filling opening 18 is provided in the left surface part 17C of the cab 17 at a position where it faces the fuel filling port 11J of the fuel tank 11. That is, as shown in FIG. 5, the fuel filling opening 18 is formed as a rectangular hole at a position behind the door 17C2 of the left surface part 17C and under the left rear window 17C3. Accordingly, the fuel filling opening 18 of the left surface part 17C is disposed at a position where it surrounds the fuel filling port 11J of the fuel tank 11 in a state of mounting the cab 17 on the revolving frame 6. As a result, the fuel filling port 11J of the fuel tank 11 can be exposed to an outside through the fuel filling opening 18, and a fuel filling work can be performed by inserting a fuel supply nozzle from outside of the cab 17 into the fuel filling port 11J of the fuel tank 11.

Figure 6:
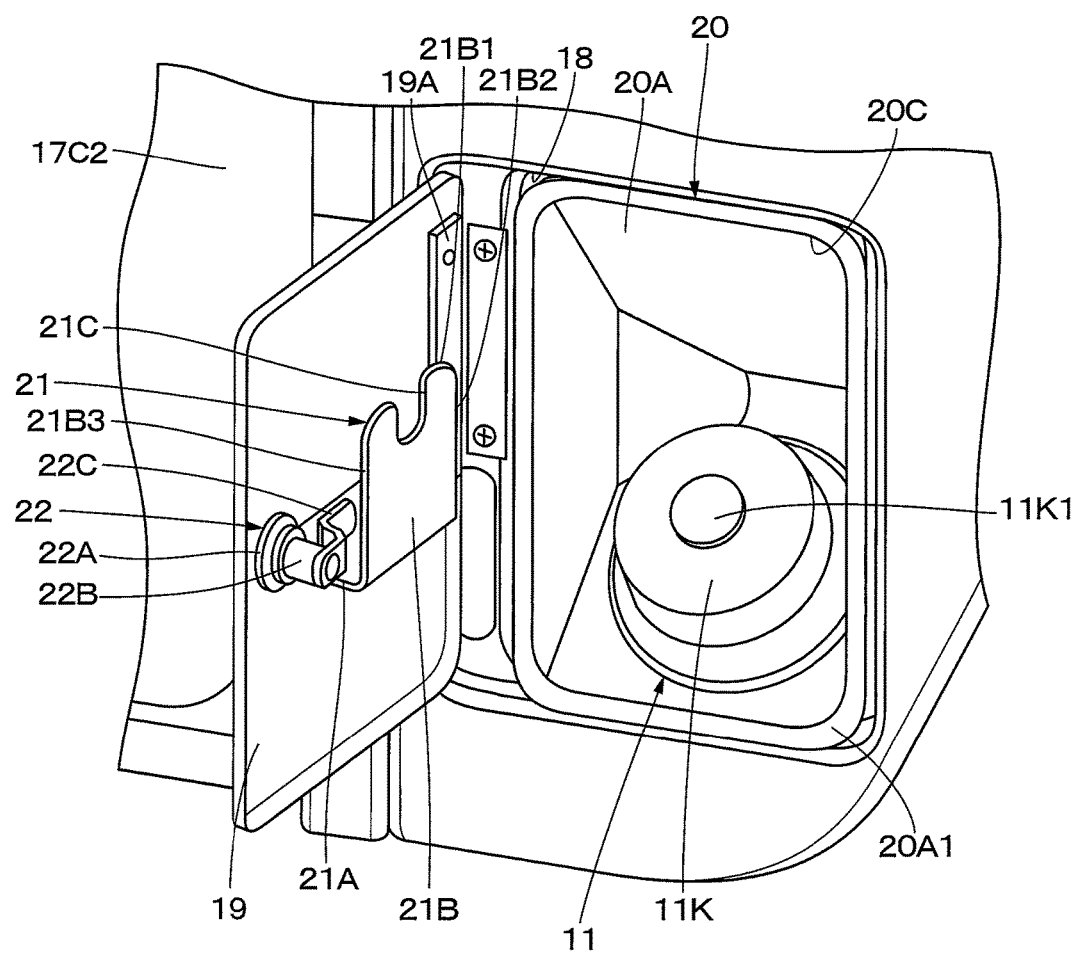
FIG. 6 is an enlarged view of a VI part in FIG. 5.

As shown in FIG. 5 and FIG. 6, the fuel filling door 19 is provided on the left surface part 17C of the cab 17 at a position corresponding to that of the fuel filling opening 18. This fuel filling door 19 is formed into a rectangular shape corresponding the fuel filling opening 18 by using a metal plate as a lid member that caps the fuel filling opening 18 capable of being opened/closed. The front side of the fuel filling door 19 is fixed to the left surface part 17C through a hinge 19A and the fuel filling door 19 is opened/closed in a single-swinging manner with the hinge 19A being set as a fulcrum.

Figure 9:
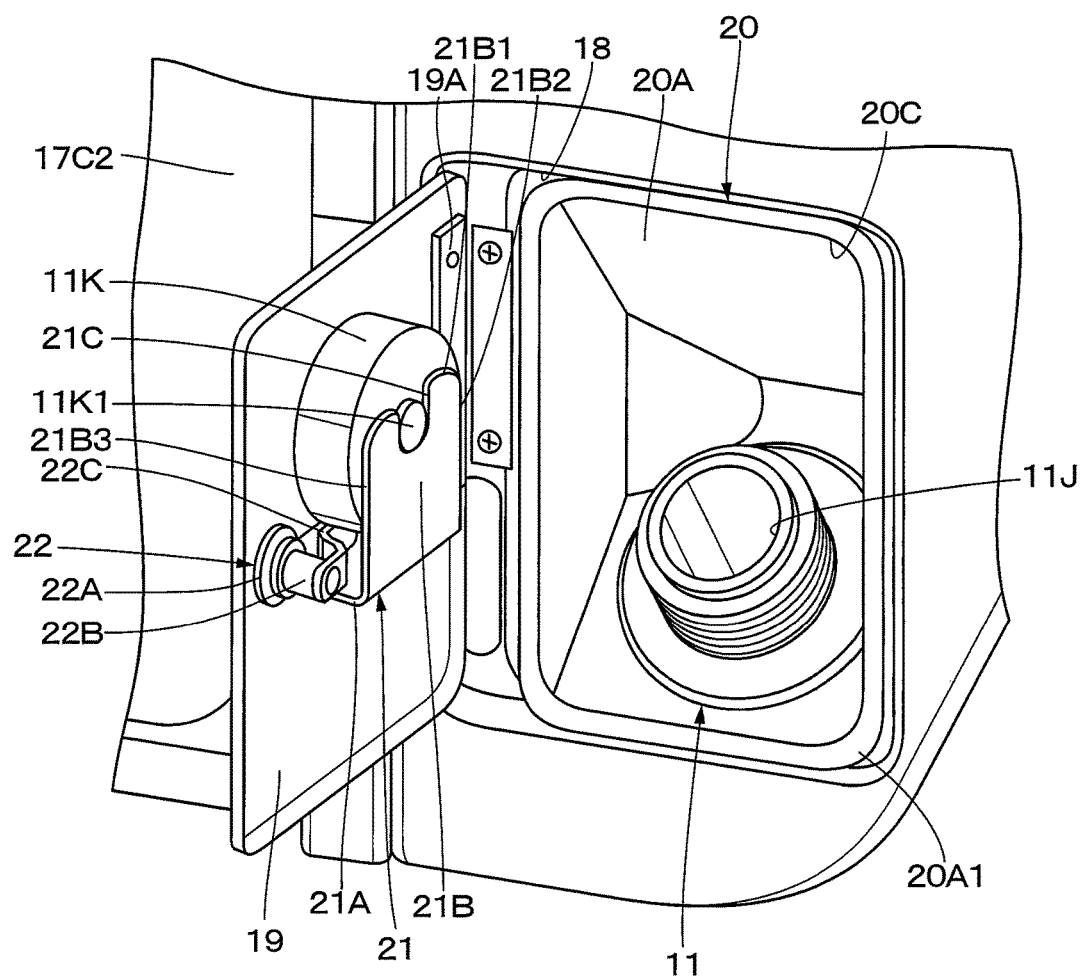
FIG. 9 is a perspective view showing a state of holding the cap of the fuel tank on a cap holder.

As shown in FIG. 9, a scattering preventing cover 20 is provided between the fuel filling port 11J of the fuel tank 11 and the fuel filling opening 18 formed in the left surface part 17C of the cab 17. The scattering preventing cover 20 is, when the fuel is spilled from the fuel filling port 11J during the fuel filling work to the fuel tank 11, to suppress scattering of this spilled fuel to the periphery of the fuel tank 11.

Figure 16:
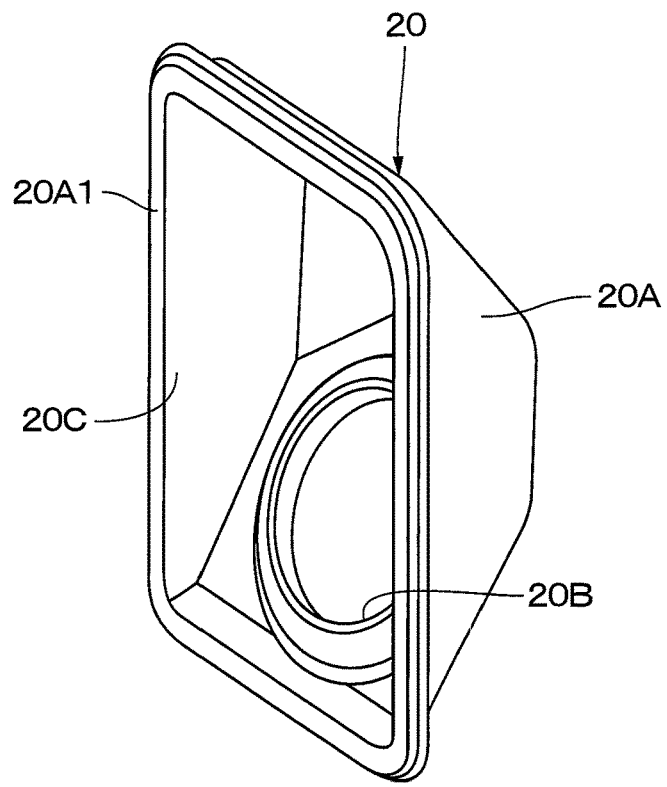
FIG. 16 is a perspective view showing a scattering preventing cover alone.
Figure 17:
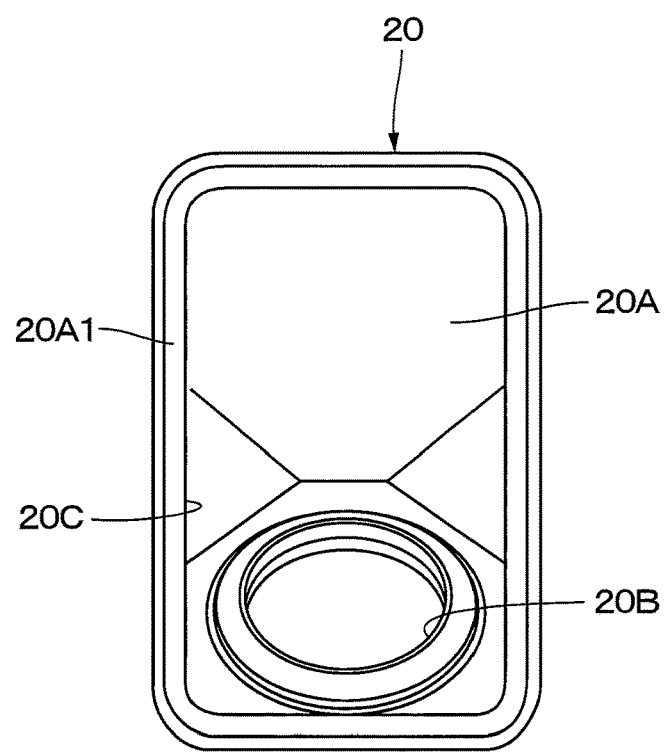
FIG. 17 is a front view showing the scattering preventing cover alone.

As shown in FIGS. 16 and 17, the scattering preventing cover 20 is formed by using, for example, an elastic resinous material and has a pyramid-shaped cylindrical part 20A expanded from the fuel tank 11 toward the left surface part 17C of the cab 17. A circular tank side opening 20B that surrounds the fuel filling port 11J of the fuel tank 11 is opened in a part that corresponds to the fuel tank 11 in the cylindrical part 20A. In the cylindrical part 20A, a part that is located on the opposite side (the left surface part 17C side of the cab 17) to the tank side opening 20B is formed as a quadrilateral cab side opening 20C that surrounds the fuel filling opening 18 of the cab 17.

Then, the scattering preventing cover 20 makes the tank side opening 20B insert and fit into the fuel filling port 11J of the fuel tank 11 and makes the cab side opening 20C fit into the fuel filling opening 18 and fix to an inner circumferential edge thereof. As a result, the scattering preventing cover 20 is configured to be disposed between the fuel filling port 11J of the fuel tank 11 and the fuel filling opening 18 of the cab 17 so as to shield the fuel filling port 11J of the fuel tank 11 against the inside of the cab 17 (see FIG. 15).

Figure 15:
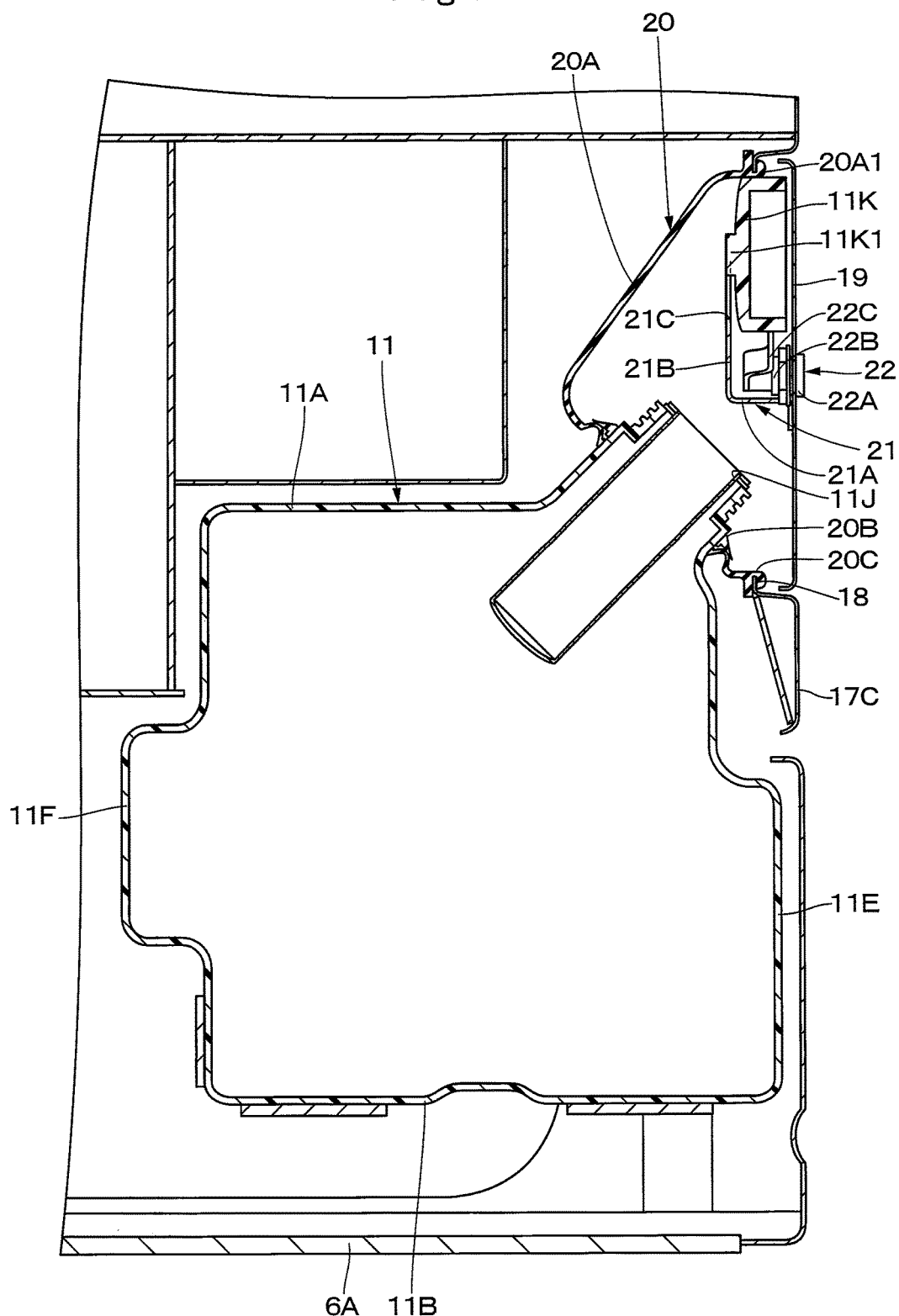
FIG. 15 is a sectional view showing the fuel tank, the fuel filling port, the cap, the cap holder and the like seen from an arrow XV-XV direction in FIG. 14.

Here, an outer circumferential edge part of the cab side opening 20C of the scattering preventing cover 20 is formed as a frame part 20A1 of the cylindrical part 20A. As shown in FIG. 15, this frame part 20A1 surrounds the circumference of the fuel filling opening 18 and fits into the fuel filling opening 18 over the whole circumference of an inner circumferential edge thereof. The frame part 20A1 configures an abutting member on which this cap 11K abuts when the cap 11K that is held on a cap holder 21 that will be described later is pushed upward by a lock 22 that will be described later.

Next, the cap holder 21, the lock 22 used in the present embodiment will be described.

As shown in FIG. 6, the cap holder 21 is located on the inner surface side of the fuel filling door 19 and is provided at an substantially center position of the fuel filling door 19. This cap holder 21 is formed by a horizontal plate 21A and a vertical plate 21B as a plate body that is bent into a substantially L shape. In addition, a guide groove 21C is provided on the leading end side of the vertical plate 21B (the top end 21B1 side) so as to be located on a middle part in the left-right direction (a width direction). That is, the guide groove 21C is located on the top end 21B1 of the vertical plate 21B and is provided between a front end 21B2 and a rear end 21B3. This guide groove 21C is formed as a U-shaped notched groove that extends in the up-down direction from the top end 21B1 of the vertical plate 21B toward a lower end thereof and it is a groove into which a grip part 11K1 that constitutes part of the cap 11K is to be inserted. Specifically, the guide groove 21C is opened in a direction in which the cap 11K is able to move by being pushed by a lock lever 22C when the lock lever 22C that will be described later rotationally moves from an unlocked position to a locked position.

Here, the base end side of the horizontal plate 21A is fixedly attached to the inner surface side of the fuel filling door 19 by means such as welding and the like. Thereby, a gap that is just as wide as a width dimension of the horizontal plate 21A is formed between the vertical plate 21B of the cap holder 21 and an inner surface of the fuel filling door 19. Then, it is possible to hold the cap 11K in a gap between the vertical plate 21B and the inner surface of the fuel filling door 19 by engaging the grip part 11K1 of the cap 11K with the guide groove 21C (see FIG. 9).

Figure 8:
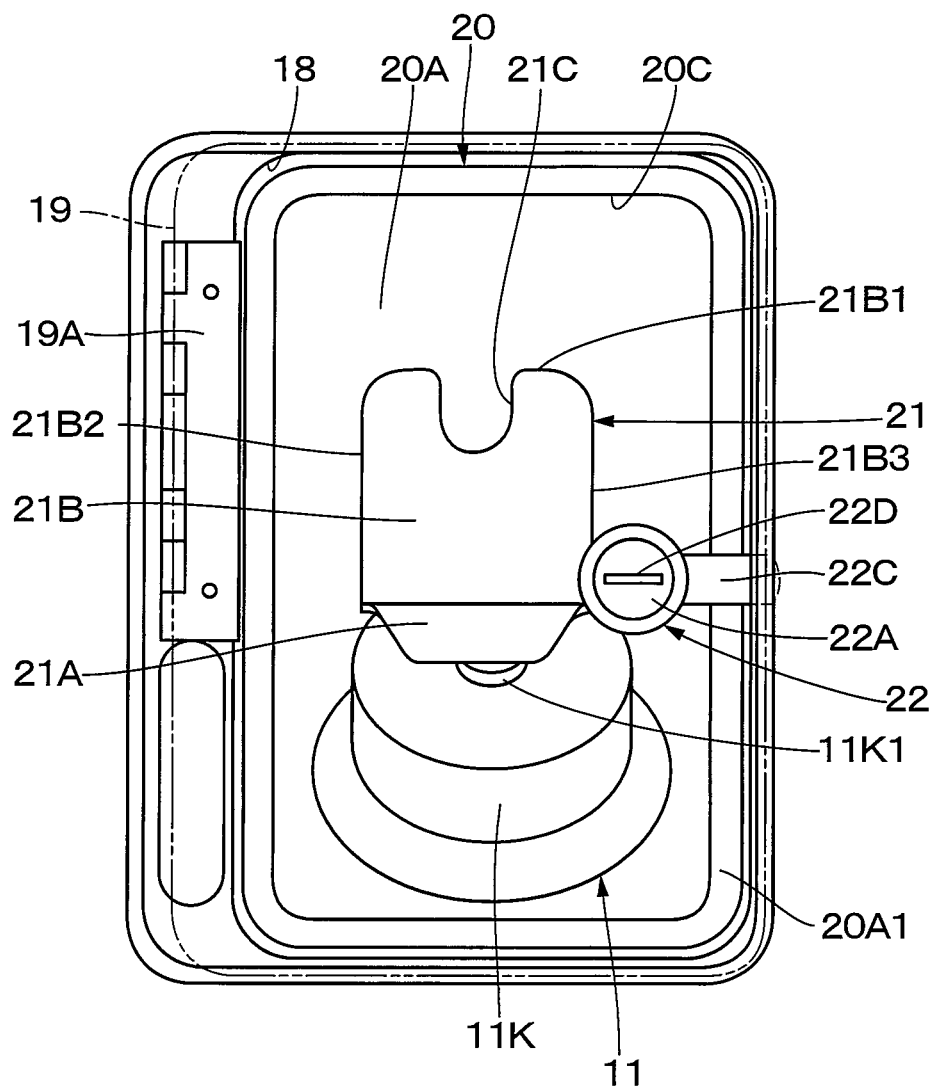
FIG. 8 is a front view showing the state where the fuel filling door is capped by closing the fuel filling port of the fuel tank using the cap, seeing through the lid member.

As shown in FIG. 8, the lock 22 is located on the rear end side of the fuel filling door 19 (the side opposite to the hinge 19A) and is provided at an substantially center position in the up-down direction (a height direction) of the fuel filling door 19. This lock 22 is configured by a mounting member 22A that is provided by being fixed to the fuel filling door 19, a cylindrical rotating member 22B that is rotatably attached to the mounting member 22A, the lock lever 22C that is attached to the rotating member 22B, and a key hole 22D that is provided through the mounting member 22A and the rotating member 22B. The rotating member 22B is rotatably attached to the mounting member 22A on the base end side and projects from the inner surface side of the fuel filling door 19 toward the fuel tank 11 side on the leading end side. The lock lever 22C is attached to the rotating member 22B on the base end side and enters into a gap between an inner surface of the vertical plate 21B of the cap holder 21 and the inner surface of the fuel filling door 19 on the leading end side.

The lock 22 is adapted to perform unlocking and locking of the fuel filling door 19 with the fuel filling opening 18 closed by inserting a key (not shown) into the key hole 22D so as to rotationally move the rotating member 22B and the lock lever 22C. In other words, the lock 22 rotationally moves between the locking position where the fuel filling door 19 maintains a state where the fuel filling opening 18 is closed and the unlocking position where the fuel filling door 19 allows opening of the fuel filling opening 18.

Here, the lock lever 22C is configured by a long member which base end side is fixed to the rotating member 22B and a lengthwise middle part is bent. The lock lever 22C rotationally moves (rotates) 180 degrees in a circumferential direction in linkage with the rotating member 22B. In a case where the lock 22 is at the locking position, a leading end of the lock lever 22C is inserted into a lever insertion hole 23 provided in a side surface of the fuel filling opening 18 and the fuel filling door 19 maintains the state where the fuel filling opening 18 is closed (see FIG. 7, FIG. 8). On the other hand, in a case where the lock 22 is at the unlocked position, the leading end of the lock lever 22C is placed on the horizontal plate 21A of the cap holder 21 and it becomes possible for the fuel filling door 19 to open the fuel filling opening 18 (see FIG. 6).

The small-sized hydraulic excavator 1 according to this embodiment has the constitution as above and subsequently, an operation of the hydraulic excavator 1 will be described.

The small-sized hydraulic excavator 1 having a machine weight of approximately 0.8 to 8 tons is transported to a work site in a state loaded on a bed of a truck. When the hydraulic excavator 1 has been transported to the work site, the operator opens the door 17C2 of the cab 17, gets on the cab 17 through the entranceway 17C1 and seats on the operator's seat 14 disposed on the cab 17. The operator seated on the operator's seat 14 operates the engine 7 and then, operates the left and right traveling lever pedals 16 disposed on the front side of the operator's seat 14. As a result, the hydraulic excavator 1 is self-propelled to a desired work site by the lower traveling structure 2.

After the small-sized hydraulic excavator 1 has been self-propelled to the desired work site, the operator operates the operation device 14A provided on the both sides of the operator's seat 14. As a result, the hydraulic excavator 1 can perform the disassembling work inside the building, a ditch excavating work in a narrow street or the like, an excavating work of earth and sand and the like by using the working mechanism 5, while the upper revolving structure 4 is revolved on the lower traveling structure 2.

Here, in a case the fuel in the fuel tank 11 is not sufficient, the lock 22 is rotationally moved from the locked position to the unlocked position and opens the fuel filling door 19. Thereby, the fuel filling port 11J of the fuel tank 11 is exposed to the outside through the fuel filling opening 18 (see FIG. 6). Then, the cap 11K is removed from the fuel filling port 11J of the fuel tank 11 that is disposed in the fuel filling opening 18 and the fuel is filled in a state of inserting the fuel supplying nozzle into the fuel filling port 11J.

In this case, the grip part 11K1 of the removed cap 11K is inserted into the guide groove 21C in the cap holder 21. Therefore, the cap 11K is held in the gap between the vertical plate 21B of the cap holder 21 and the inner surface of the fuel filling door 19 (see FIG. 9). Thereby, it is possible to eliminate possibilities of missing of the cap 11K caused by letting it fall into the hydraulic excavator 1 and of staining thereof caused by letting it fall to the ground.

Figure 7:
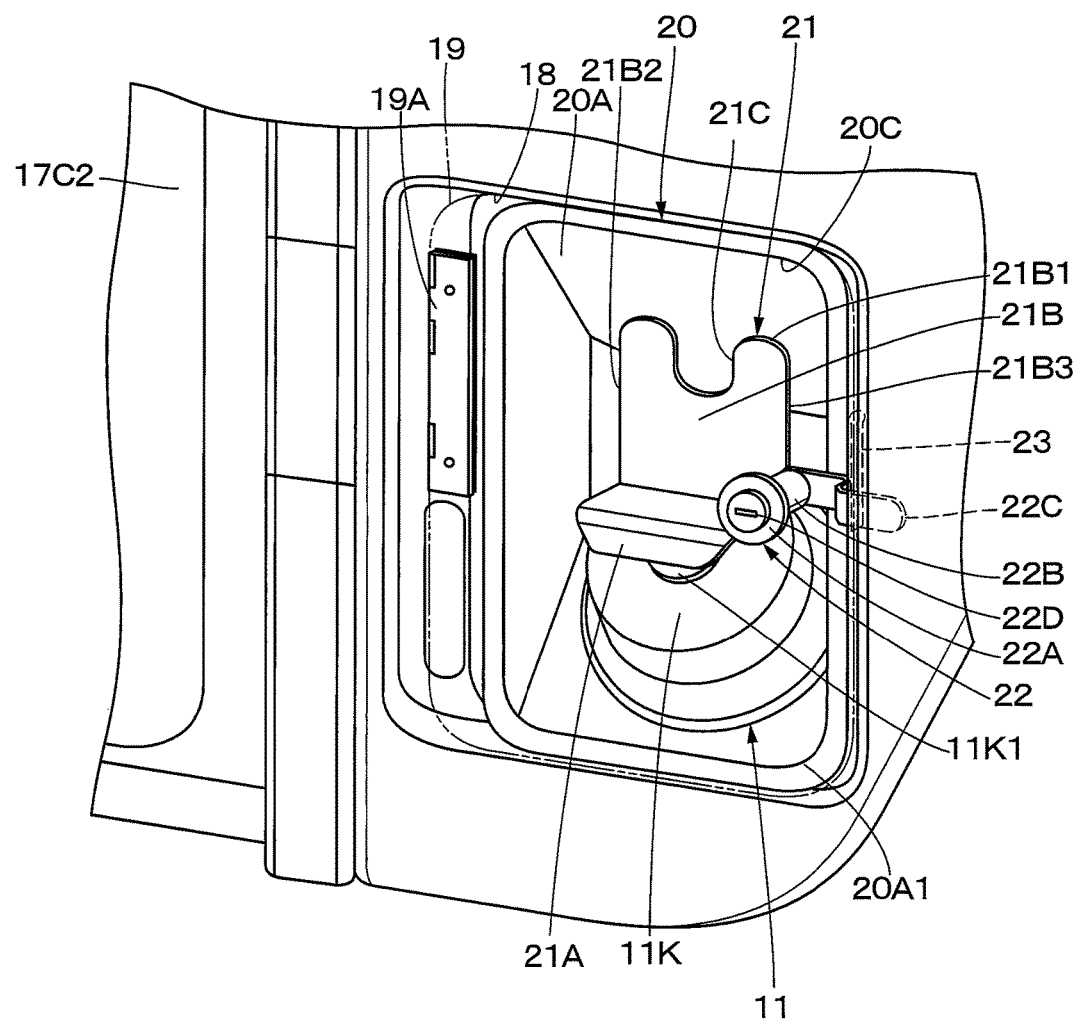
FIG. 7 is a perspective view showing a state where the fuel filling door is capped by closing a fuel filling port of the fuel tank using a cap, seeing through a lid member.

As shown in FIG. 6, in a case of locking the lock 22, the cap 11K is removed from the cap holder 21 to close the fuel filling port 11J of the fuel tank 11. Then, as shown in FIG. 7 and FIG. 8, the fuel filling door 19 is locked from the outside by rotationally moving the lock 22 toward a lever insertion hole 23 in the circumferential direction in a state where the fuel filling door 19 closes the fuel filling opening 18.

Figure 10:
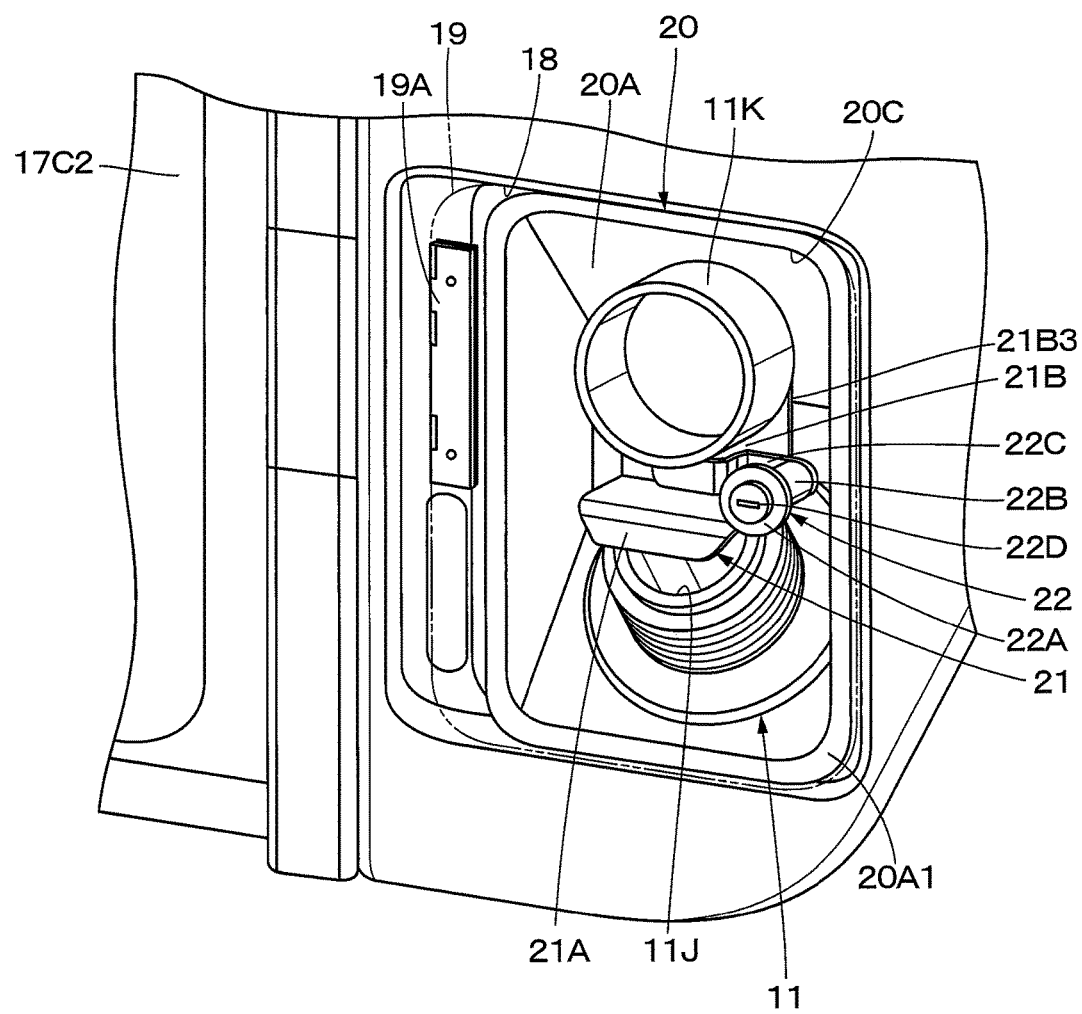
FIG. 10 is a perspective view showing a state where the fuel filling door is capped with the cap being held on the cap holder, seeing through the lid member.
Figure 11:
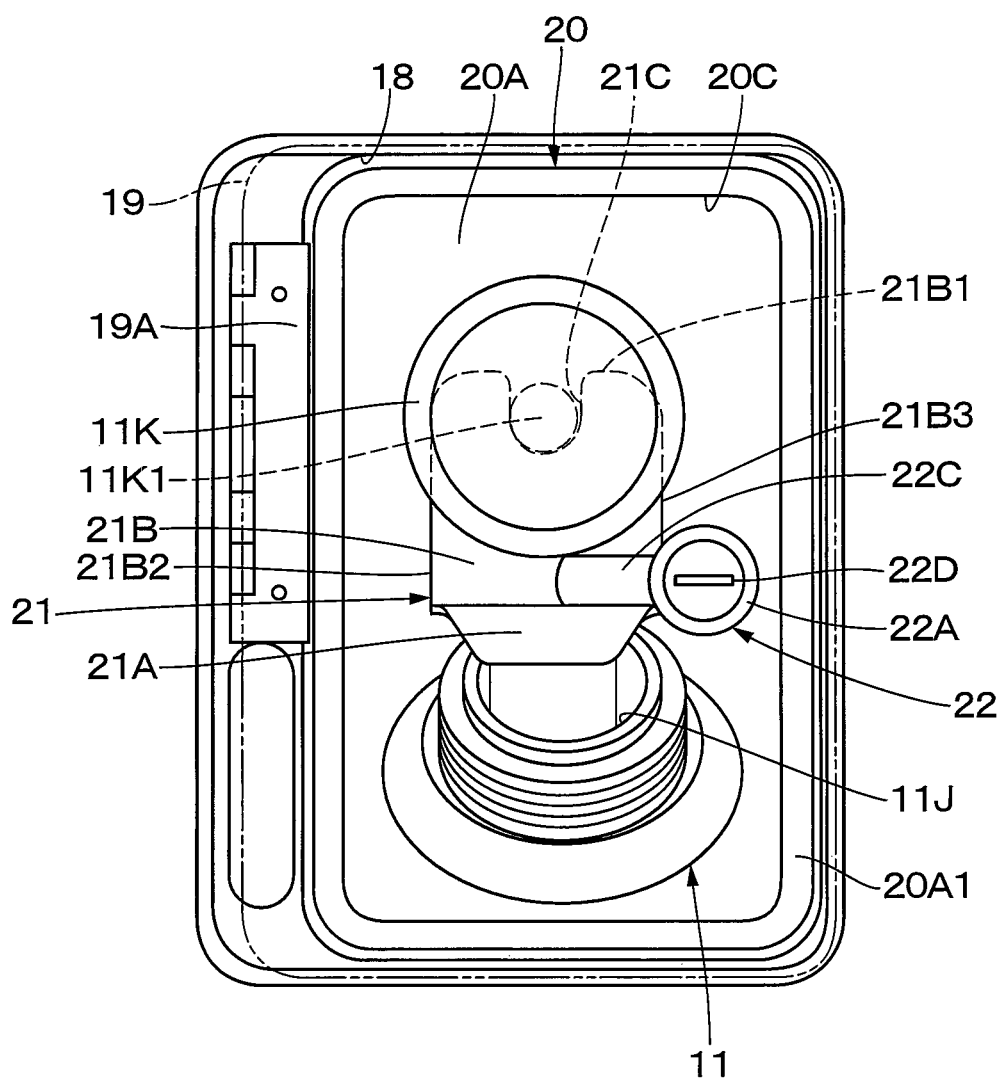
FIG. 11 is a front view showing the state where the fuel filling door is capped with the cap being held on the cap holder, seeing through the lid member.
Figure 12:
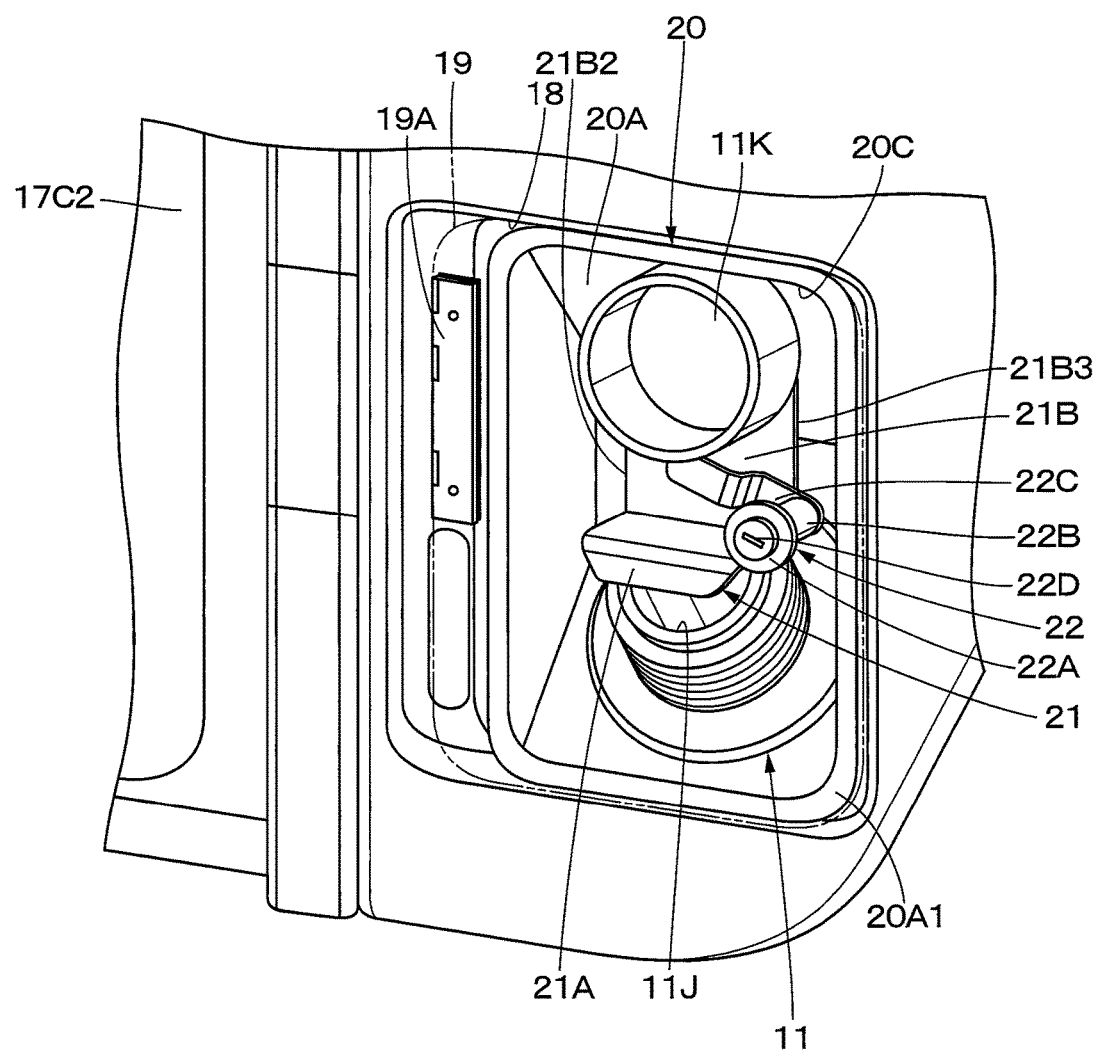
FIG. 12 is a perspective view showing a state where a lock is unlocked with the cap being held on the cap holder, seeing through the lid member.
Figure 13:
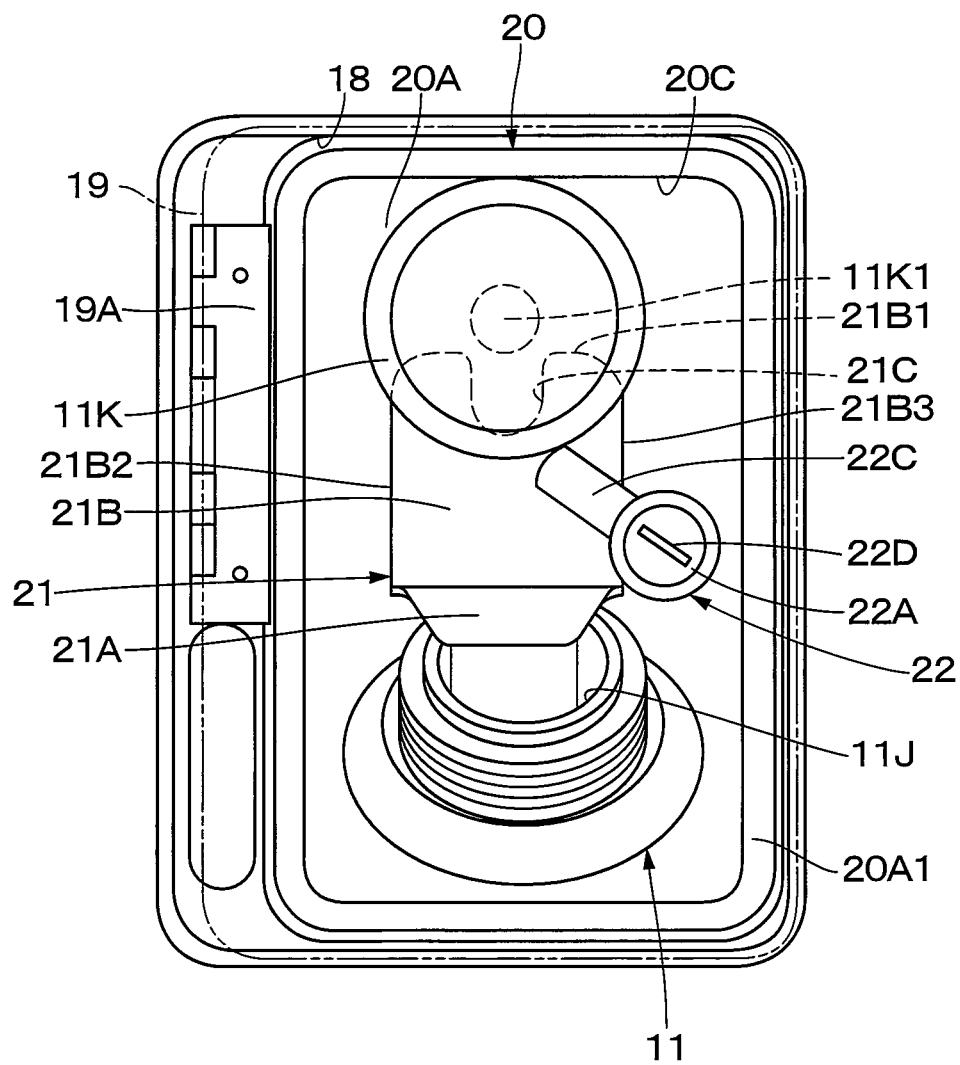
FIG. 13 is a front view showing the state where the lock is unlocked with the cap being held on the cap holder, seeing through the lid member.
Figure 14:
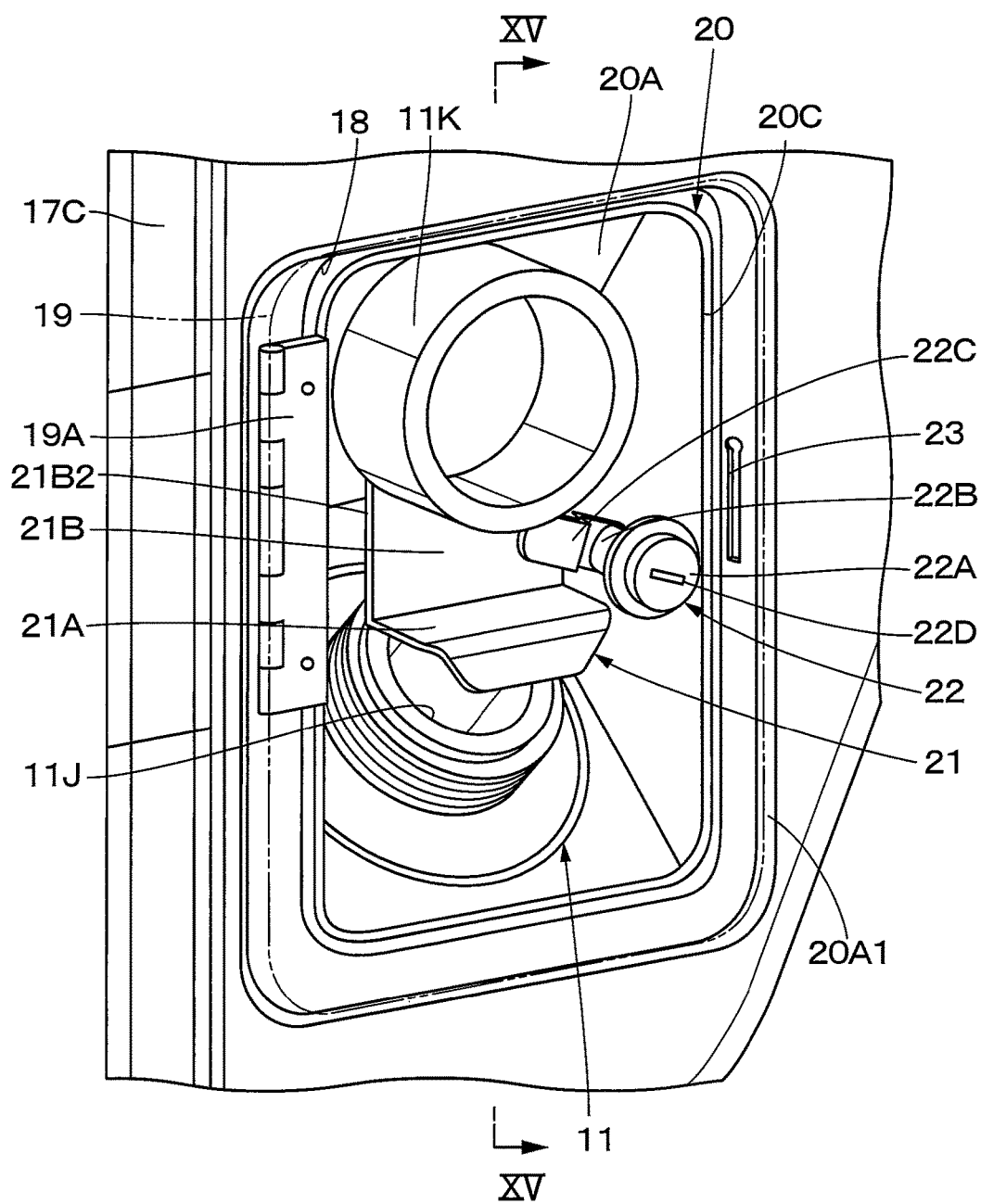
FIG. 14 a perspective view showing the state where the lock is unlocked with the cap being held on the cap holder from the left front, seeing through the lid member.

In contrast, in a case where the fuel filling door 19 has been closed with the cap 11K being held on the cap holder 21, since the lock 22 does not rotationally move to the locking position, the fuel filling door 19 cannot be closed. That is, as shown in FIG. 9 to FIG. 11, the cap 11K is placed on the lock lever 22C of the lock 22 in a state where the cap 11K is held on the cap holder 21. Then, in a case of rotationally move the lock 22 to lock, a leading end part of the lock lever 22C acts to move the cap 11K upward along the guide groove 21C (push upward). Therefore, a top end of the cap 11K abuts on a top end of the frame part 20A1 of the scattering preventing cover 20 (see FIG. 12 to FIG. 14).

Accordingly, the lock 22 does not rotationally move toward the locking position anymore and locking of the fuel filling door 19 becomes impossible. Thereby, in a case where the fuel filling door 19 has been closed with the cap 11K being held on the cap holder 21, the lock 22 cannot be locked. Accordingly, omission of closing the cap 11K is noticed and thus it is possible to prevent omission of closing the cap 11K relative to the fuel filling port 11J. Consequently, it is possible to confirm to cap the fuel filling port 11J of the fuel tank 11 with the cap 11K.

Thus, in the small-sized hydraulic excavator 1 according to the present embodiment, the cap holder 21 attached to the inner surface side of the fuel filling door 19 and the lock 22 that locks the fuel filling door 19 from the outside are provided on the fuel filling door 19. This lock 22 has the lock lever 22C that rotationally moves between the locking position where the fuel filling door 19 maintains the state where the fuel filling opening 18 is closed and the unlocking position where the fuel filling door 19 allows opening of the fuel filling opening 18. Then, in the lock lever 22C, the base end is rotatably attached to the fuel filling door 19 and the leading end is able to enter the gap between the fuel filling door 19 and the cap holder 21.

Thereby, in a case where the cap 11K is held on the cap holder 21, it is possible to place the lock lever 22C of the lock 22 between the horizontal plate 21A of the cap holder 21 and the cap 11K. Accordingly, in a case where the fuel filling door 19 has been closed with the cap 11K being held on the cap holder 21, the lock 22 does not rotationally move to the locking position and therefore the fuel filling door 19 cannot be closed. That is, in a case of rotationally moving the lock 22 to be locked, the leading end part of the lock lever 22C acts to move the cap 11K upward and thereby the top end of the cap 11K abuts on the top end of the frame part 20A1 of the scattering preventing cover 20. Consequently, rotational movement of the lock 22 toward the locking position is restricted and the fuel filling door 19 cannot be locked. Accordingly, omission of closing the cap 11K is noticed and then it becomes possible to prevent omission of closing the cap 11K relative to the fuel filling port 11J.

In addition, the U-shaped guide groove 21C into which the grip part 11K1 of the cap 11K enters is provided in the top end 21B1 of the cap holder 21. Thereby, the cap 11K that is held on the cap holder 21 is able to move along the guide groove 21C by being pushed by the lock lever 22C that rotationally moves from the unlocking position to the locking position. Consequently, since the guide groove 21C in the cap holder 21 allows the cap 11K to move upward while guiding it, it is possible to bring the cap 11K to abut on the top end of the frame part 20A1 of the scattering preventing cover 20.

In addition, the fuel tank 11 is disposed on the lower side of the operator's seat platform 13 in the cab 17 and on the rear side of the door 17C2. On the other hand, the fuel filling opening 18 is provided on the rear side of the door 17C2 of the cab 17, facing the fuel filling port 11J of the fuel tank 11. Thereby, it is possible to mount the fuel tank 11 onto the revolving frame 6 even in the small-sized hydraulic excavator 1 that the upper revolving structure 4 is small, and a space for installation of the mounted devices on the revolving frame 6 is narrow. Consequently, it is possible to fill the fuel tank 11 by using the fuel supplying nozzle and the like through the fuel filling opening 18 provided on the rear side of the door 17C2.

In addition, the frame part 20A1 acting as the abutting member on which the cap 11K pushed by the lock lever 22C abuts when rotationally moving the lock lever 22C from the unlocking position to the locking position in a state of holding the cap 11K on the cap holder 21 is provided on the fuel filling opening 18. Thereby, when the cap 11K has been moved upward by the lock lever 22C, it is possible to suppress direct abutment of the cap 11K on the fuel filling opening 18. Consequently, it is possible to prevent the cap 11K from being damaged due to abutment of the cap 11K on the fuel filling opening 18.

Moreover, the scattering preventing cover 20 which prevents the filled fuel from scattering around is provided between the fuel filling opening 18 and the fuel filling port 11J of the fuel tank 11. In this case, the scattering preventing cover 20 shields the fuel filling port 11J of the fuel tank 11 from the inside of the cab 17 by inserting/fitting the tank-side opening 20B in the fuel filling port 11J of the fuel tank 11, and fitting the cab-side opening 20C over the entire circumference on the inner peripheral edge of the fuel filling opening 18. As a result, even if the fuel is spilled from the fuel filling port 11J of the fuel tank 11 during the fuel filling work to the fuel tank 11, this spilled fuel can be shielded by the scattering preventing cover 20 from the inside of the cab 17. As a result, adhesion of the spilled fuel to the engine 7 whose temperature has become high or scattering of the same into the cab 17 and causing an odor can be suppressed, and a work environment can be kept favorable.

In addition, in the scattering preventing cover 20, the frame part 20A1 that surrounds the circumference of the fuel filling opening 18 is configured so as to also serve as the abutting member that abuts with the cap 11K. Thereby, it is possible to integrally form the scattering preventing cover 20 and the abutting member that abuts on the cap 11K by an integral component. Consequently, it is possible to reduce the number of components and it is possible to suppress a manufacturing cost.

In addition, the lock lever 22C of the lock 22 is configured to perform unlocking and locking by rotating 180 degrees in the circumferential direction. Thereby, when the lock lever 22C is rotationally moved from the unlocking position to the locking position in a state of holding the cap 11K on the cap holder 21, it is possible to move the cap 11K upward by the lock lever 22C. Consequently, it is possible to bring the cap 11K into abutment on the frame part 20A1 of the scattering preventing cover 20 and to make locking of the fuel filling door 19 impossible. Thereby, omission of closing the cap 11K is noticed and thus it is possible to prevent omission of closing the cap 11K relative to the fuel filling port 11J.

Figure 18:
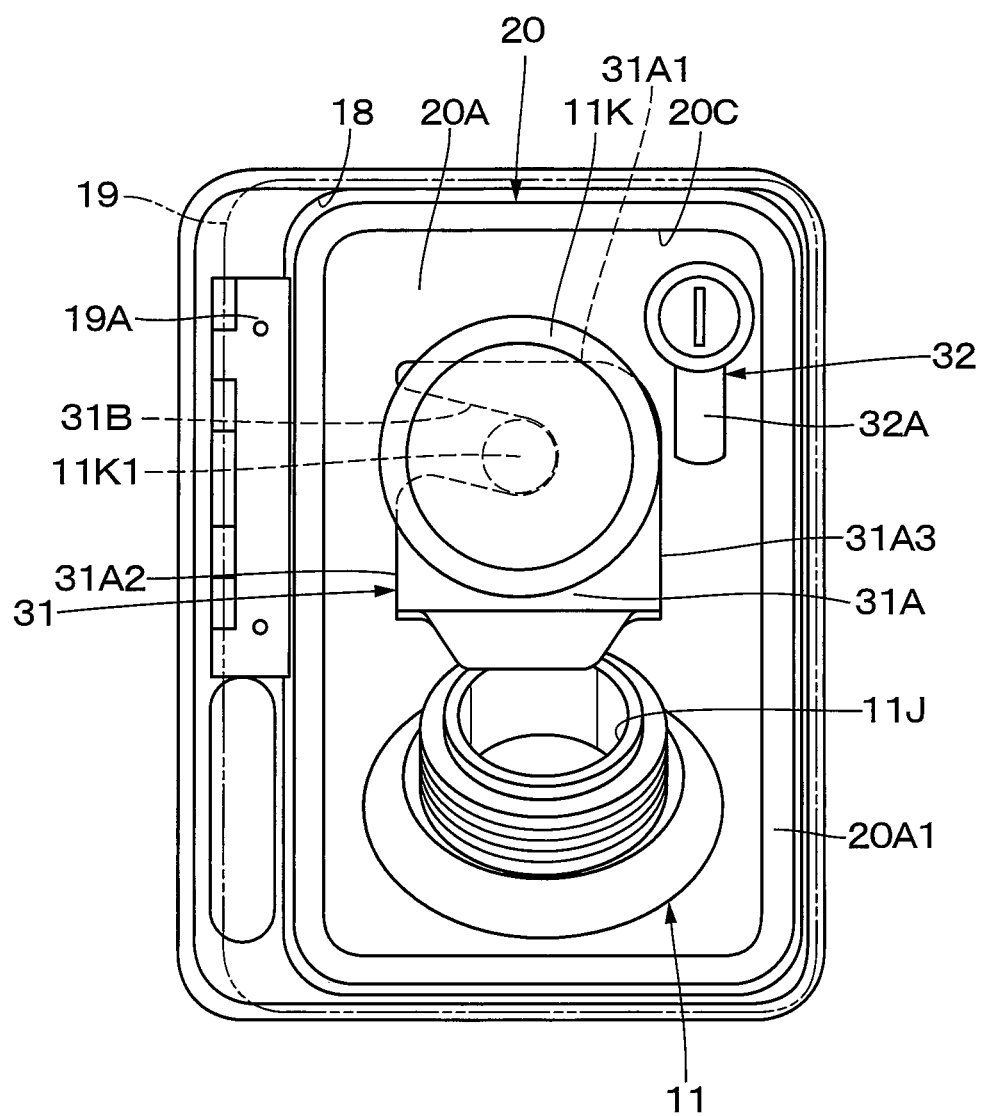
FIG. 18 is a front view showing the cap holder according to a first modified example, seeing through the lid member.

It should be noted that, the configuration that the guide groove 21C in the cap holder 21 is formed as the U-shaped notched groove that extends in the up-down direction from the top end 21B1 to the lower end of the vertical plate 21B is made in the aforementioned embodiment. However, the present invention is not limited to this and may be also configured as in, for example, a first modified example shown in FIG. 18 and FIG. 19. That is, a guide groove 31B in a cap holder 31 is not formed in a top end 31A1 of a vertical plate 31A and is formed as a U-shaped notched groove that diagonally extends from the front end 31A2 side toward the rear end 31A3 side of the vertical plate 31A as shown in FIG. 18. On the other hand, a configuration that a lock 32 is provided on a rear-side top end of the fuel filling door 19 may be also made.

Figure 19:
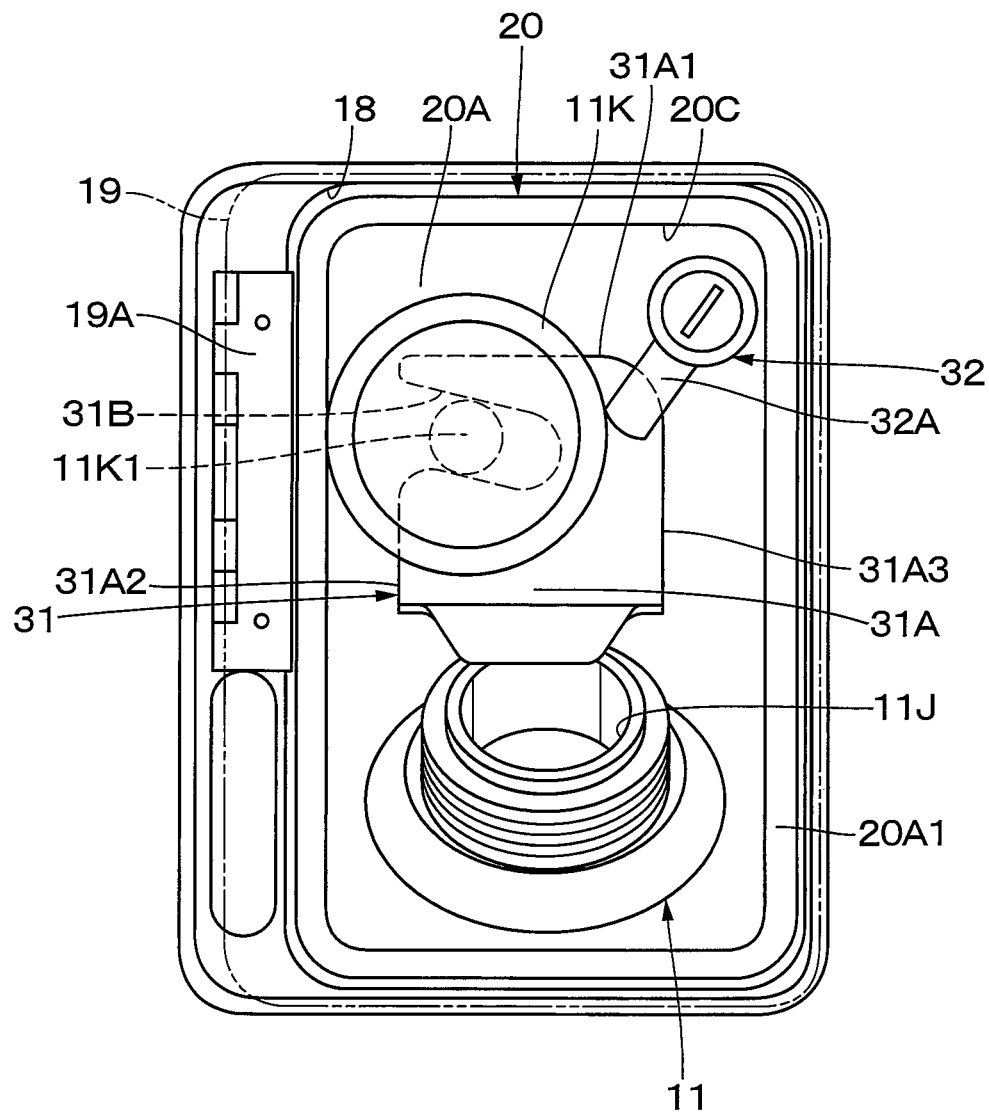
FIG. 19 is a front view showing a state where the lock is unlocked with the cap being held on the cap holder according to the first modified example, seeing through the lid member.
Figure 20:
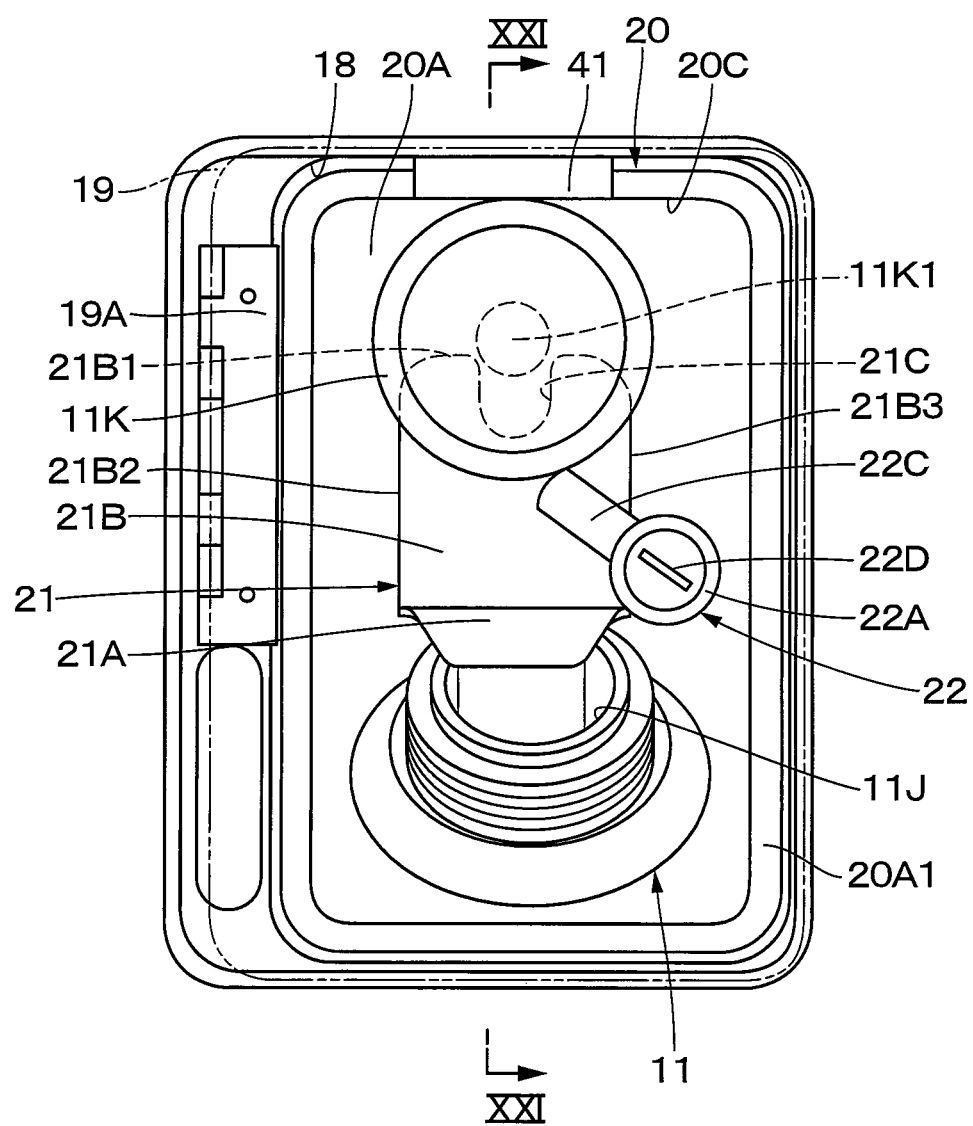
FIG. 20 is a front view showing an abutting member according to a second modified example, seeing through the lid member.
Figure 21:
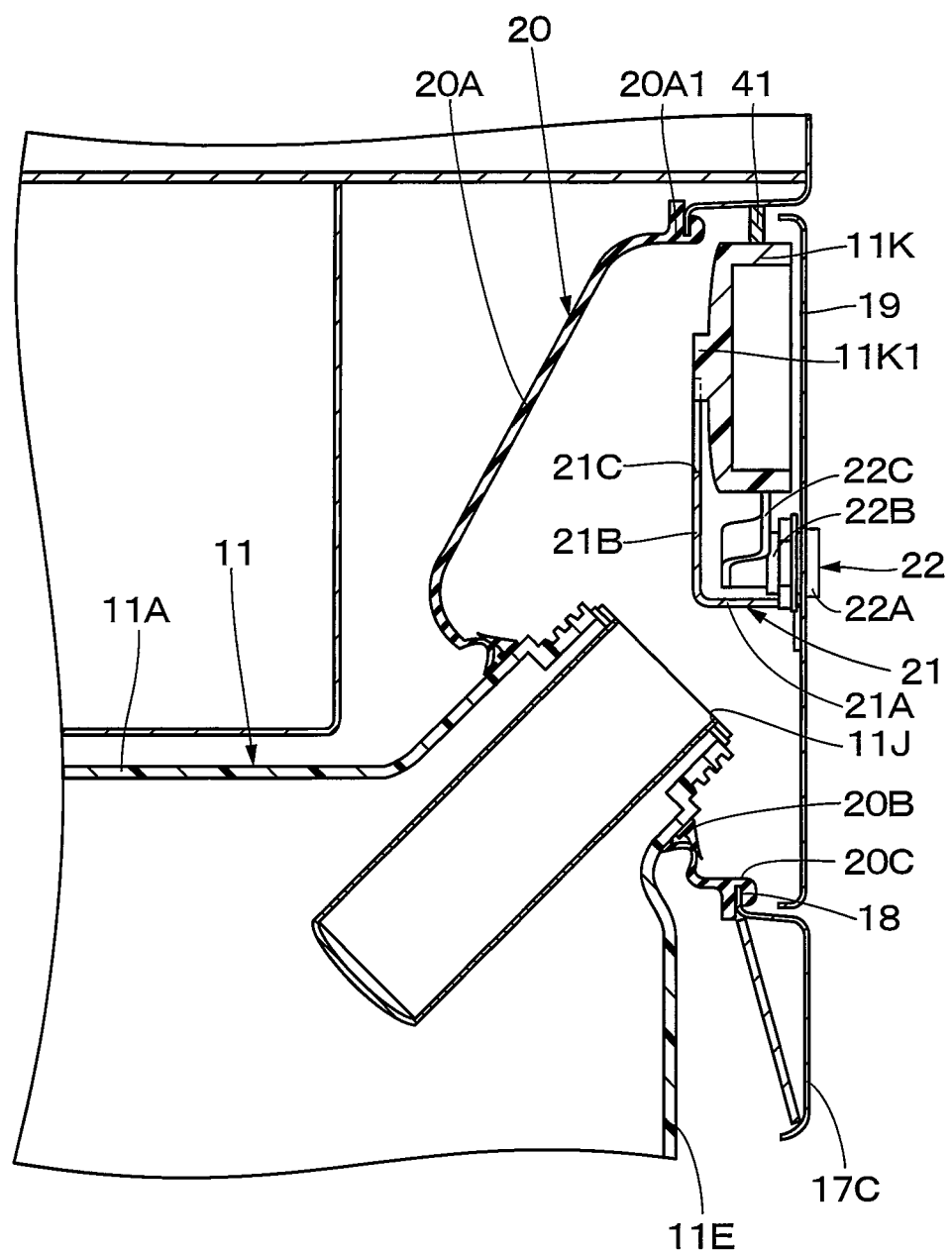
FIG. 21 is a sectional view showing the fuel tank, the fuel filling port, the cap, the cap holder, the abutting member and the like seen from an arrow XXI-XXI direction in FIG. 20.

In this case, as shown in FIG. 19, when locking is performed by rotationally moving the lock 32 in a state of holding the cap 11K on the cap holder 31, a lock lever 32A acts to move the cap 11K toward the front side (the hinge 19A side) along the guide groove 31B. Thereby, since the cap 11K abuts on the frame part 20A1 of the scattering preventing cover 20, further rotational movement of the lock lever 32A is restricted and locking of the fuel filling door 19 becomes impossible. Accordingly, even in the first modified example, in a case where the fuel filling door 19 has been closed with the cap 11K being held on the cap holder 31, the lock 32 cannot be licked and therefore it is possible to prevent omission of closing the cap 11K relative to the fuel filling port 11J.

In addition, in the aforementioned embodiment, it is constituted such that in a case where locking is performed by rotationally moving the lock 22 in the state of holding the cap 11K on the cap holder 21, the lock lever 22C acts to move the cap 11K upward along the guide groove 21C and the top end of the cap 11K abuts on the top end of the frame part 20A1 of the scattering preventing cover 20. However, the present invention is not limited to this and may be also configured as in, for example, a second modified example shown in FIG. 20 and FIG. 21.

That is, a sheet metal member 41 made of a metal as an abutting member may be constituted so as to fixedly attached to the top end of the fuel filling opening 18 by means such as welding and the like. Thereby, since the cap 11K that is pushed by the lock lever 22C abuts on the sheet metal member 41 and further rotational movement of the lock lever 22C is restricted, the fuel filling door 19 cannot be locked. Accordingly, even in the second modified example, it is possible to prevent omission of closing the cap 11K relative to the fuel filling port 11J.

In addition, in the aforementioned embodiment, it is configured such that the guide groove 21C in the cap holder 21 is formed as the U-shaped notched groove that extends in the up-down direction from the top end 21B1 toward the lower end of the vertical plate 21B. However, the present invention is not limited to this and may be configured as in, for example, a third modified example shown in FIG. 22. That is, it may be constituted such that a guide groove 51B in a cap holder 51 is formed as an inverted L-shaped notched groove that is bent substantially at right angles from a top end 51A1 of a vertical plate 51A and extends toward the front end 51A2 side.

Figure 22:
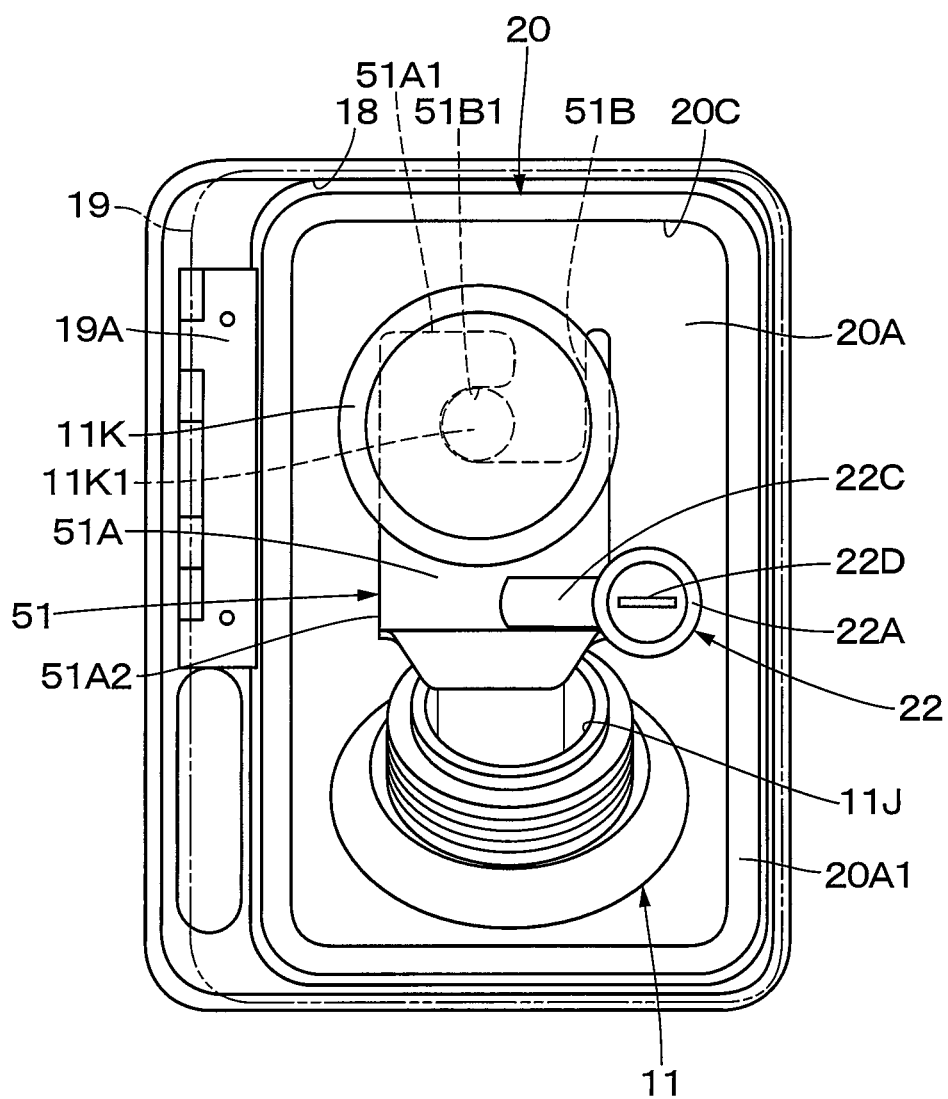
FIG. 22 is a front view showing the cap holder according to a third modified example, seeing through the lid member.

In this case, as shown in FIG. 22, the grip part 11K1 of the cap 11K is held on a holder part 51B1 acting as a closing end of the guide groove 51B in a state of holding the cap 11K on the cap holder 51. Thereby, movement of the cap 11K in the up-down direction is restricted. Accordingly, in a case where locking is performed by rotationally moving the lock 22, since rotational movement of the lock 22 toward the locking position is restricted by abutment of the lock lever 22C on the cap 11K, the fuel filling door 19 cannot be locked. Consequently, even in the third modified example, in a case where the fuel filling door 19 has been closed with the cap 11K being held on the cap holder 51, the lock 22 cannot be locked and therefore it is possible to prevent omission of closing the cap 11K relative to the fuel filling port 11J.

In addition, in the aforementioned embodiment, it is configured such that the outer circumference edge part of the cab side opening 20C of the scattering preventing cover 20 is formed as the frame part 20A1 of the cylindrical part 20A. However, the present invention is not limited to this and it may be configured that, for example, the scattering preventing cover and the frame part formed as separate members.

Furthermore, in the embodiment, the small-sized hydraulic excavator 1 including the crawler-type lower traveling structure 2 is described as an example, but the present invention is not limited to that and may be applied to a small-sized hydraulic excavator including a wheel-type lower traveling structure, for example.

DESCRIPTION OF REFERENCE NUMERALS

1: Small-sized hydraulic excavator (Small-sized construction machine)
2: Lower traveling structure
4: Upper revolving structure
5: Working mechanism
6: Revolving frame
7: Engine
11: Fuel tank
11J: Fuel filling port
11K: Cap
11K1: Grip part (Partial)
17: Cab
17C2: Door
18: Fuel filling opening
19: Fuel filling door (Lid member)
20: Scattering preventing cover
20A1: Frame part (Abutting member)
21, 31, 51: Cap holder
21C, 31B, 51B: Guide groove
22, 32: Lock
22C, 32A: Lock lever (Long member)
41: Sheet metal member (Abutting member)

The invention claimed is:

1. A small-sized construction machine comprising:
a self-propelled lower traveling structure;
an upper revolving structure that is rotatably mounted on said lower traveling structure; and
a working mechanism that is provided on the front part side of said upper revolving structure, wherein
said upper revolving structure includes:
a revolving frame forming a support structural body,
a counterweight provided on a rear side of said revolving frame,
an engine located on the front side of said counterweight and mounted on said revolving frame,
a cab provided on said revolving frame so as to cover said engine from above and on one side in a left-right direction of which an openable/closable door is provided, and
a fuel tank that has a fuel filling port and a cap that closes said fuel filling port and stores fuel to be supplied to said engine, wherein
a fuel filling opening that is located on the side behind said door and surrounds said fuel filling port of said fuel tank and a lid member that caps said fuel filling opening to be openable/closable are provided on an outer surface of one side in the left-right direction on which said door of said cab is provided, characterized in that:
a cap holder that is attached to the inner surface side of said lid member in a state of facing an inner surface of said lid member with an interval in order to hold said cap removed from said fuel tank and a lock that locks said lid member from the outside in a state where said lid member closes said fuel filling opening are provided on said lid member, said lock has a lock lever that is composed of a long member a base end of which is rotatably attached to said lid member and a leading end of which is allowed to enter the gap between said lid member and said cap holder and that rotationally moves between a locking position where said lid member maintains a state of closing said fuel filling opening and an unlocking position where said lid member allows opening of said fuel filling opening.

2. The small-sized construction machine according to claim 1, wherein
a U-shaped guide groove into which part of said cap enters is provided in said cap holder, and
said guide groove in said cap holder opens in a direction which said cap is allowed to move by being pushed by said lock lever when said lock lever has rotationally moved from said unlocking position to said locking position.

3. The small-sized construction machine according to claim 1, wherein
said fuel filling port of said fuel tank is provided on the rear side of said door of said cab, facing said fuel filling opening provided in said cab.

4. The small-sized construction machine according to claim 2, wherein
said fuel filling opening is configured to be equipped with an abutting member on which said cap that is pushed by said lock lever abuts when rotationally moving said lock lever from said unlocking position to said locking position in a state of holding said cap on said cap holder.

5. The small-sized construction machine according to claim 4, wherein
a scattering preventing cover that prevents fuel to be filled from scattering around is provided between said fuel filling opening and said fuel filling port of said fuel tank, and
a frame part which surrounds the circumference of said fuel filling opening is configured to also serve as said abutting member in said scattering preventing cover.

6. The small-sized construction machine according to claim 1, wherein
said lock lever of said lock performs unlocking and locking by rotating 180 degrees in a circumferential direction.

* * * * *